(12) United States Patent
Ono et al.

(10) Patent No.: US 10,066,744 B2
(45) Date of Patent: Sep. 4, 2018

(54) TRANSMISSION APPARATUS AND POWER UNIT FOR A VEHICLE, AND VEHICLE INCLUDING SAME

(71) Applicant: HONDA MOTOR CO., LTD., Minato-Ku, Tokyo (JP)

(72) Inventors: Junya Ono, Wako (JP); Jun Adachi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 262 days.

(21) Appl. No.: 15/075,873

(22) Filed: Mar. 21, 2016

(65) Prior Publication Data

US 2016/0290500 A1 Oct. 6, 2016

(30) Foreign Application Priority Data

Mar. 30, 2015 (JP) .................................. 2015-070021

(51) Int. Cl.
| | | |
|---|---|---|
| *F16H 59/04* | (2006.01) | |
| *F16H 3/00* | (2006.01) | |
| *F16H 61/32* | (2006.01) | |
| *F16H 63/18* | (2006.01) | |
| *F16H 61/28* | (2006.01) | |
| *F16H 61/00* | (2006.01) | |

(52) U.S. Cl.
CPC ............ *F16H 61/32* (2013.01); *F16H 63/18* (2013.01); *B60Y 2300/427* (2013.01); *F16H 2061/0087* (2013.01); *F16H 2061/2823* (2013.01)

(58) Field of Classification Search
CPC ............. F16H 3/006; F16H 3/02; F16H 59/02

USPC ................ 74/330, 335, 337.5, 473.3, 473.36
See application file for complete search history.

(56) References Cited

U.S. PATENT DOCUMENTS

| | | | | |
|---|---|---|---|---|
| 9,677,622 | B2* | 6/2017 | Mordukhovich | ....... F16D 13/52 |
| 9,803,746 | B2* | 10/2017 | Mizuno | ................... F16H 61/28 |
| 2007/0144292 | A1* | 6/2007 | Koyama | ................. F16H 61/26 74/473.16 |
| 2013/0255415 | A1* | 10/2013 | Adachi | ................. F16H 59/042 74/337.5 |
| 2015/0276053 | A1* | 10/2015 | Mizuno | ................... F16H 61/28 74/335 |
| 2015/0377303 | A1 | 12/2015 | Adachi et al. | |
| 2016/0290500 | A1* | 10/2016 | Ono | ....................... F16H 61/32 |

FOREIGN PATENT DOCUMENTS

| | | | |
|---|---|---|---|
| JP | H01-120438 A | 5/1989 | |
| WO | 2014/157631 A1 | 10/2014 | |

* cited by examiner

*Primary Examiner* — Ha Dinh Ho
(74) *Attorney, Agent, or Firm* — Carrier Blackman & Associates, P.C.; Joseph P. Carrier; Jingli Wang

(57) ABSTRACT

A transmission apparatus for a vehicle includes a shift spindle having a clutch actuator, and also includes a shift actuator adapted to operate a shift drum. The apparatus also includes a motor for rotating the shift spindle, and a controller for controlling the motor. In use, the clutch actuator is rotated prior to the shift actuator when the shift spindle is rotated to a shift-down side. The controller rotates the shift spindle to a shift-up side and stores, as a standard duty, a driving duty of the motor at the time when a rotary angle of the shift drum reaches a drum angle threshold. Then, the controller rotates the shift spindle to a shift-down side, and learns a rotary angle of the shift spindle at the time when the standard duty is generated, as a touch point at which the clutch is initially partially engaged.

12 Claims, 22 Drawing Sheets

TRANSMISSION APPARATUS AND POWER UNIT FOR A VEHICLE, AND VEHICLE INCLUDING SAME

CROSS-REFERENCE TO RELATED APPLICATIONS

The present invention claims priority under 35 USC 119 based on Japanese patent application No. 2015-070021, filed on Mar. 30, 2015. The entire subject matter of this priority document, including specification claims and drawings, is incorporated by reference herein.

BACKGROUND OF THE INVENTION

Technical Field of the Invention

The present invention relates to a transmission apparatus for a vehicle, to a power unit including the transmission apparatus, and to a vehicle incorporating the power unit.

Background Art

Conventionally, in regard of multiple disc clutches, there has been disclosed a structure in which three stages of clutch capacity (a fully engaged, a higher intermediate capacity, and a lower intermediate capacity) can be selected (see, for example, Patent Document 1).

Such a clutch is particularly suitable for a so-called AMT (Automated Manual Transmission) vehicle in which a shift is performed automatically. The reason lies in that, while a shift in an AMT vehicle is performed at a timing not intended by the driver, the shift shock can be reduced by selecting the clutch capacity in accordance with the throttle position, or the like, when a rotation difference is generated between the engine rotary speed (clutch outer rotary speed) and the main shaft rotary speed (clutch inner rotary speed), at the time of engagement of the clutch after movements of transmission gears.

Here, though not disclosed in detail in Patent Document 1, the clutch lift characteristic relative to the shift spindle angle on the shift-up side varies at a comparatively gentle gradient and, in addition, the three stages of the clutch capacity can be set on the basis of each clutch lift amount of a predetermined width. Therefore, even in the presence of variability regarding tolerance of the clutch or the shift spindle or the like, the shift spindle angle corresponding to a target partial clutch engagement capacity (for example, the higher intermediate capacity) can be set comparatively easily. Besides, it is also comparatively easy to adjust the shift spindle position to the target partial clutch engagement capacity.

In addition, although also not disclosed in detail in Patent Document 1, the clutch lift characteristic relative to the shift spindle angle on the shift-down side is set to rise early and increase at a steep gradient. Where there is variability regarding tolerance of the components, therefore, it is difficult to set the shift spindle angle in conformity with a target partial clutch engagement capacity (for example, the higher intermediate capacity). Besides, it is also comparatively difficult to adjust the shift spindle position to the target partial clutch engagement capacity. In the present application, the rotary angle of the shift spindle at which the clutch capacity is switched over to partial clutch engagement on the shift-down side is defined as "touch point."

If the touch point can be learned, it can be applied to the AMT system; for example, it becomes possible to use an intermediate clutch capacity in shift control on the shift-down side as well, or to determine whether or not the clutch position has been regulated by the user or the like.

In another conventional example, a touch point learning method has been disclosed (see, for example, Patent Document 2). In Patent Document 2, there is disclosed a control for learning a touch point of a clutch by examining variations in the rotary speed of a main shaft while engaging and disengaging the clutch during when the engine is operating and the gear position is at neutral, as in the flow shown in FIG. 5 of the document.

Patent Document 1

PCT Patent Publication No. WO 2014/157631

Patent Document 2

Japanese Patent Laid-Open No. 1989-120438

Problem to be Solved by the Invention

However, the conventional examples have a problem as follows. In the case where learning of a touch point, as disclosed in Patent Document 2, is performed at a neutral position in a transmission apparatus with a three-stage capacity clutch, as disclosed in Patent Document 1, there may arise a situation, depending on the engine specifications and rotary speed, that the clutch would not slide even upon a change from the fully engaged to the higher intermediate clutch capacity. In such a situation, it is difficult to learn the touch point. In addition, where the clutch lift characteristic relative to the rotary angle of the shift spindle is steep, it is difficult to learn the touch point with high accuracy.

SUMMARY OF THE INVENTION

The present invention has been made in consideration of the above-mentioned problem in the related art. Accordingly, it is an object of the present invention to enable a touch point of a clutch in a transmission apparatus for a vehicle to be learned with high accuracy.

Means for Solving the Problem

In order to achieve the above object, according to the present invention, there is provided a transmission apparatus for a vehicle. The transmission apparatus for a vehicle according to a first illustrative embodiment includes: a main shaft (65) to which rotary power of an engine (21) is routed through a clutch (61) and which is provided with a plurality of driving gears including a driving-side shifter gear (67b); a countershaft (66) provided with a plurality of driven gears including a driven-side shifter gear (68c), the driven gears rotated by the plurality of driving gears; a plurality of shift forks (69a, 69b) adapted to move the driving-side shifter gear (67b) and the driven-side shifter gear (68c) in an axial direction; a shift drum (70) provided with a lead groove (70a) for engagement with end portions of the shift forks (69a, 69b); a drum angle sensor (70b) adapted to detect rotary angle of the shift drum (70); a shift spindle (76) provided with a clutch actuator (62) adapted to operate the clutch (61) and with a shift actuator (63) adapted to operate the shift drum (70); a spindle angle sensor (79) adapted to detect rotary angle of the shift spindle (76); a motor (75) adapted to rotate the shift spindle (76); and a controller (17) adapted to control the motor (75); the clutch (61) having a partial clutch engagement state (C2) between a fully engaged state (C1) and a clutch disengaged state (C4). In the transmission apparatus for a vehicle, the clutch actuator (62) is rotated prior to the shift actuator (63) when the shift spindle (76) is rotated to a shift-down side. In addition, the controller (17) rotates the shift spindle (76) to a shift-up side, stores as a standard duty (Dustd) a driving duty of the motor (75) at the time when the rotary angle of the shift drum (70) reaches a drum angle threshold (Sd1), thereafter rotates the shift spindle (76) to a shift-down side, and learns a rotary angle (θdtp) of the shift spindle (76) at the time when the standard duty (Dustd) is generated, as a touch point at which the clutch (61) is put into the partial clutch engagement state (C2).

In accordance with the present invention, the controller rotates the shift spindle to the shift-up side, stores as the standard duty the driving duty of the motor at the time when the rotary angle of the shift drum reaches the drum angle threshold, thereafter rotates the shift spindle to the shift-down side, and learns the rotary angle of the shift spindle at the time when the standard duty is generated, as the touch point at which the clutch is put into a partial clutch engagement state. With this process, when the controller rotates the shift spindle to the shift-up side, the driving duty of the motor at the time when the shift drum reaches the drum angle threshold can be stored as the standard duty. Thereafter, when the controller rotates the shift spindle to the shift-down side, the clutch actuator is rotated prior to the shift actuator, and, therefore, it can be detected that the driving duty corresponding to the torque for operating the clutch actuator has become the standard duty. The standard duty has a predetermined magnitude corresponding to the torque required for causing the shift drum to reach the drum angle threshold. By learning the rotary angle of the shift spindle at the time when the standard duty is generated on the shift-down side as the touch point at which the clutch is put into the partial clutch engagement state, therefore, the touch point on the shift-down side can be learned with high accuracy, while excluding influences of, for example, frictions near the neutral position of the shift spindle.

The transmission apparatus for a vehicle according to the present invention may have a configuration wherein control of the shift spindle (76) at the time of learning the touch point is carried out through ramp response.

In accordance with the present invention, the control of the shift spindle at the time of learning the touch point is carried out using ramp response, so that variation in the torque of the shift spindle is reflected on the driving duty with high accuracy. Consequently, the touch point can be learned highly accurately.

The transmission apparatus for a vehicle according to the present invention may have a configuration wherein a characteristic of clutch lift amount of the clutch (61) in relation to the rotary angle of the shift spindle (76) is so set that the clutch lift amount on the shift-down side rises at a small rotary angle and increases at a steep gradient as compared with the clutch lift amount on the shift-up side.

In accordance with the present invention, the characteristic of clutch lift amount of the clutch in relation to the rotary angle of the shift spindle is so set that the clutch lift amount on the shift-down side rises at a small rotary angle and increases at a steep gradient as compared to the clutch lift amount on the shift-up side. Although it is usually difficult to learn a touch point on the shift-down side with high accuracy, therefore, it is possible, by utilizing the standard duty stored on the shift-up side, to learn the touch point on the shift-down side highly accurately. In addition, on the shift-down side, since the characteristic of clutch lift amount has a steep gradient, the rise time of the driving duty corresponding to the clutch lift is short, but the rise in the driving duty is clear. Therefore, by comparison with the standard duty, the touch point can be learned with high accuracy.

The transmission apparatus for a vehicle according to the present invention may have a configuration wherein control of learning of the touch point is carried out when the engine (21) is started, or once each time a main power source of the vehicle (10) is supplied.

In accordance with the present invention, since the control of the learning of the touch point is carried out when the engine is started, or once each time a main power source of the vehicle is supplied, the touch point can be learned with high accuracy when the engine is started or each time the main power source of the vehicle is supplied.

Further, the transmission apparatus for a vehicle according to the present invention may have a configuration wherein the controller (17) stores in a nonvolatile memory the touch point learned when the engine (21) has been operated last time or when a power source of the transmission apparatus (25) has been turned on last time, and compares the touch point learned this time with the touch point learned last time.

In accordance with the present invention, the controller stores in the nonvolatile memory the touch point learned when the engine has been operated last time or when the power source of the transmission apparatus has been turned on last time, and compares the tough point learned this time with the touch point learned last time. Therefore, it is possible to determine whether or not the touch point has varied or the touch point has been regulated by the user or the like during when the engine or the vehicle has been at a stop.

Advantageous Effect of the Invention

In the transmission apparatus for a vehicle according to the present invention, the touch point on the shift-down side can be learned with high accuracy.

In addition, the touch point can be learned highly accurately through ramp response of the shift spindle.

Besides, even where the characteristic of clutch lift amount rises at a small rotary angle and increases at a steeper gradient, the touch point can be learned with high accuracy.

Furthermore, the touch point can be learned highly accurately when the engine is started or each time the main power source of the vehicle is supplied.

In addition, it can be determined whether or not the touch point has changed during when the engine or the vehicle has been at a stop.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIGS. 12A-12B illustrate a gear shift arm, wherein FIG. 12A is a front view of the gear shift arm, and FIG. 12B is a sectional view taken along line XII-XII of FIG. 12A.

FIGS. 15A-15D illustrate positional states of a dog tooth of a shift-down collar, wherein FIG. 15A shows a neutral state, and FIG. 15B, FIG. 15C and FIG. 15D show states of sequentially increased rotary amounts of the shift spindle.

FIGS. 19A-19B illustrate operating states of the change mechanism, wherein FIG. 19A shows a state upon completion of normal feeding in a shift-down direction, and FIG. 19B shows a state of returning toward a neutral position side from the state of FIG. 19A.

DETAILED DESCRIPTION OF ILLUSTRATIVE EMBODIMENTS

Figure 1:
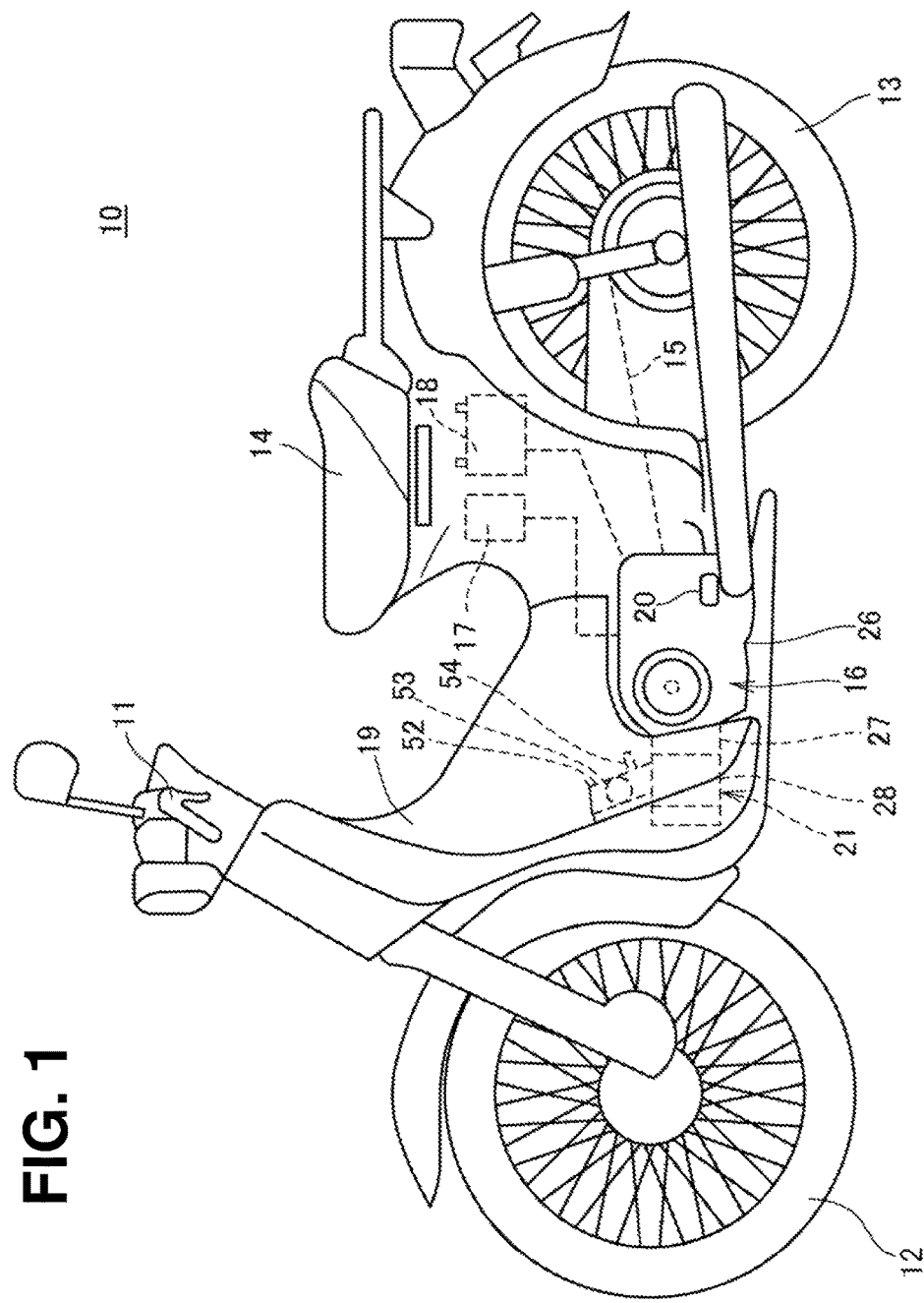
FIG. 1 is a left side view of a motorcycle provided with an automatic transmission apparatus according to an embodiment of the present invention.

An embodiment of the present invention will now be described, with reference to the drawings. Throughout this description, relative terms like "upper", "lower", "above", "below", "front", "back", and the like are used in reference to the orientation of the components as shown in the drawings. It should be understood that these terms are used for purposes of illustration, and are not intended to limit the invention.

FIG. 1 is a left side view of a motorcycle 10 provided with an automatic transmission apparatus 25 according to an embodiment of the present invention.

The motorcycle 10 (vehicle) includes a handlebar 11 rotatably supported on a head pipe (not shown), a front wheel 12 steered by the handlebar 11, a rear wheel 13 as a driving wheel, a seat 14 on which to seat a driver, a power unit 16 adapted to supply a driving force to the rear wheel 13 through a chain 15, a control unit 17 (controller) adapted to control the power unit 16, and a battery 18.

The motorcycle 10 is configured based on a body frame (not shown), and the body frame is covered with a body cover 19. The control unit 17 and the battery 18 are disposed under the seat 14 and inside the body cover 19. The power unit 16 is provided at a roughly middle position between the front wheel 12 and the rear wheel 13, downwardly and slightly forwardly of the seat 14. A pair of left and right driver footrests 20 are provided at lower portions of the power unit 16.

The configuration of the power unit 16 will now be described.

Figure 2:
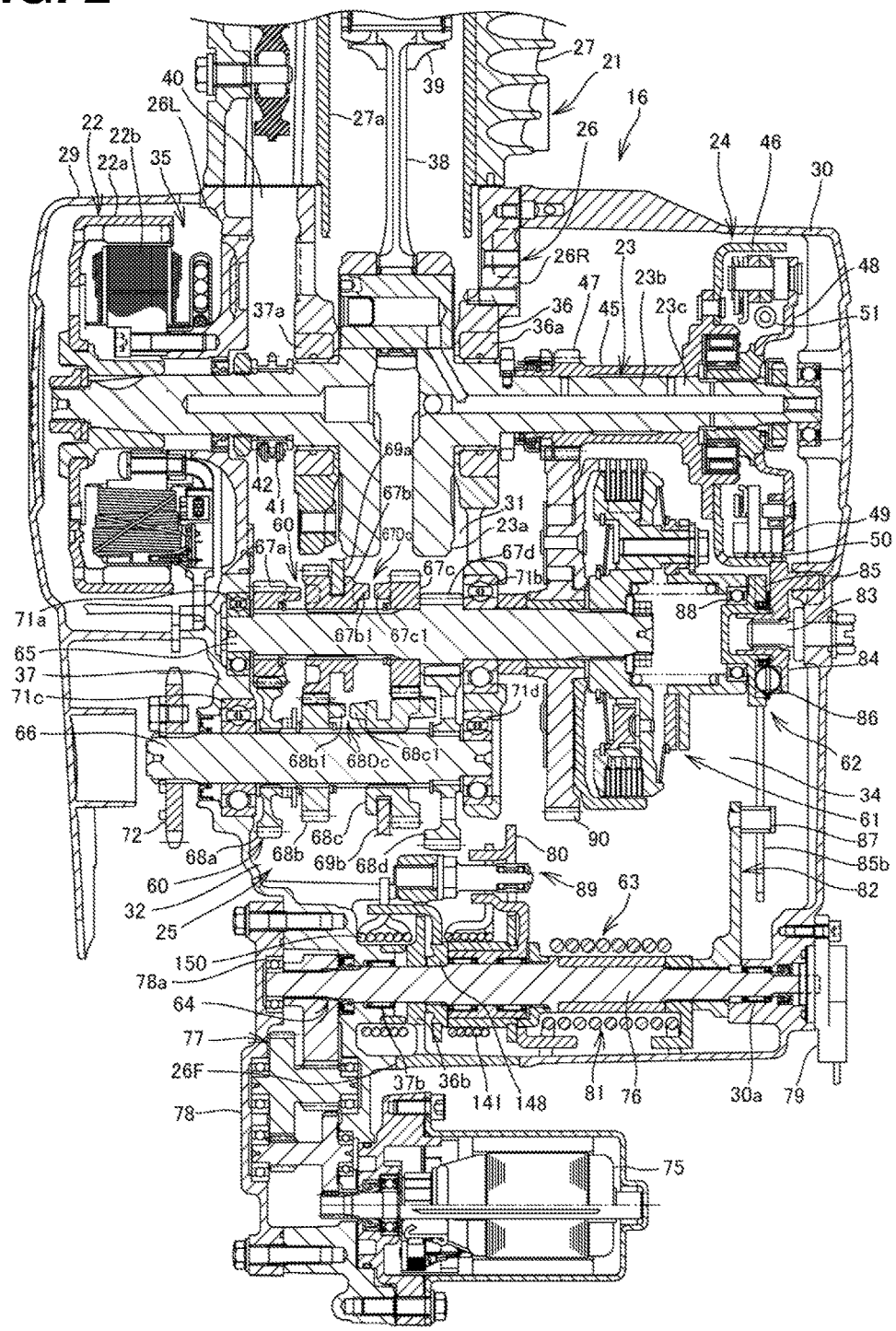
FIG. 2 is a sectional view of a power unit.

FIG. 2 is a sectional view of the power unit 16. In FIG. 2, the left-right direction on the sheet surface corresponds to the transverse direction (vehicle width direction), the upward direction on the sheet surface corresponds to the forward direction of the vehicle, and the downward direction on the sheet surface corresponds to the rearward direction of the vehicle.

The power unit 16 includes an engine 21 adapted to generate a driving force for running, a generator 22, a starting clutch 24 provided on a crankshaft 23 of the engine 21, and the automatic transmission apparatus 25 adapted to output a driving force of the crankshaft 23 (which is outputted through the starting clutch 24) with speed change.

The engine 21 is configured by integrally connecting a crankcase 26 (case member), a cylinder 27, and a cylinder head 28.

As illustrated in FIG. 1, an intake pipe 52 extending from an air cleaner box (not shown) is connected to an intake port of the cylinder head 28. The intake pipe 52 is provided with an electronically controlled throttle valve 53 for regulating the quantity of air supplied to the engine 21. In the intake pipe 52, a fuel injection valve 54 is provided downstream of the throttle valve 53.

The crankcase 26 is configured to be bisected to a left portion and a right portion (in the transverse direction) at a plane orthogonal to the crankshaft 23. Specifically, the crankcase 26 has a one-side case half 26L on the left side and another-side case half 26R on the right side. In addition, the engine 21 is provided with a generator cover 29 which covers the one-side case half 26L from the left side, and a clutch cover 30 which covers the other-side case half 26R from the right side.

The one-side case half 26L and the other-side case half 26R are mated with each other at a faying surface 26F (faying portion), and are coupled together by a plurality of coupling bolts (not shown) extending in the transverse direction.

A crank chamber 31 in which to accommodate the crankshaft 23 is provided at a front portion of the inside of the crankcase 26. In the crankcase 26, a transmission chamber 32 is provided rearwardly of the crank chamber 31. The transmission chamber 32 is partitioned by a wall portion 37 (a wall portion of the case member; outer wall) of the one-side case half 26L constituting a left side surface of the crankcase 26, and a wall portion 36 (inner wall) of the other-side case half 26R constituting a right side surface of the crankcase 26.

A clutch chamber 34 is provided on the right side of the crank chamber 31 and the transmission chamber 32. A generator chamber 35 is provided on the left side of the crank chamber 31. The clutch chamber 34 is partitioned by an outside surface of the wall portion 36 of the other-side case half 26R and an inside surface of the clutch cover 30. The generator chamber 35 is partitioned by an outside surface of the wall portion 37 of the one-side case half 26L and an inside surface of the generator cover 29.

The crankshaft 23 has a crank web 23a, and a shaft portion 23b extending toward both sides in the transverse direction from the crank web 23a. Of the crankshaft 23, the crank web 23a is disposed within the crank chamber 31, and the shaft portion 23b is rotatably borne on bearing portions 36a and 37a provided respectively at the wall portion 36 and the wall portion 37. A connecting rod 38 is connected to the crank web 23a through a crank pin. A piston 39 connected to a tip of the connecting rod 38 is reciprocated within a cylinder bore 27a of the cylinder 27.

One end of the shaft portion 23b of the crankshaft 23 extends into the generator chamber 35, and this end is fixed to a rotor 22a of the generator 22. A stator 22b of the generator 22 is fixed to the one-side case half 26L.

The wall portion 37 is provided with a cam chain chamber 40 on the inside thereof. A cam chain 41 for driving a valve mechanism (not shown) in the cylinder head 28 extends through the cam chain chamber 40 and is wrapped around a valve driving sprocket 42 on the shaft portion 23b.

Another end 23c of the shaft portion 23b of the crankshaft 23 extends into the clutch chamber 34. The starting clutch 24 of a centrifugal type is provided at a tip portion of the other end 23c.

The starting clutch 24 serves for engagement and disengagement between the crankshaft 23 and the automatic transmission apparatus 25 at the time of starting of the vehicle and at the time of stopping of the vehicle.

The starting clutch 24 includes: a cup-shaped outer case 46 fixed to one end of a sleeve 45 rotatable relative to the outer circumference of the crankshaft 23; a primary gear 47 provided at the outer circumference of the sleeve 45; an outer plate 48 fixed to a right end portion of the crankshaft 23; a shoe 50 attached to an outer circumferential portion of the outer plate 48 through a weight 49 so as to be directed radially outward; and a spring 51 for biasing the shoe 50 radially inward. The starting clutch 24 is so configured that when the rotary speed of the engine is not more than a predetermined value, the outer case 46 and the shoe 50 are separate from each other, and the crankshaft 23 and the automatic transmission apparatus 25 are in a disengaged state from each other (in a separated state where power is not transmitted therebetween). When the engine rotary speed rises to exceed a predetermined value, a centrifugal force causes the weight 49 to move radially outward against the spring 51, which brings the shoe 50 into contact with an inner circumferential surface of the outer case 46. This causes the sleeve 45 to be fixed onto the crankshaft 23 together with the outer case 46, resulting in that the rotation of the crankshaft 23 is transmitted to the automatic transmission apparatus 25 through the primary gear 47.

In the automatic transmission apparatus 25, switching-over of a change clutch 61 which will be described later and switching-over of gear position (shift) are performed automatically.

The automatic transmission apparatus 25 includes: a forward four-speed normally meshed transmission 60; the change clutch 61 (clutch) adapted to switch over the connection between the crankshaft 23 side and the transmission 60; a clutch operation mechanism 62 (clutch actuator) adapted to operate the change clutch 61; a gear change mechanism 63 (shift actuator) adapted to change gear in the transmission 60; and an actuator mechanism 64 adapted to drive the clutch operation mechanism 62 and the gear change mechanism 63. The actuator mechanism 64 is controlled by the control unit 17 (FIG. 1).

The automatic transmission apparatus 25 is connected to a mode switch 132b (FIG. 9) for switching between an automatic transmission (AT) mode and a manual transmission (MT) mode, and to a shift selection switch 132a (FIG. 9) operated by the driver to select either a shift-up or a shift-down. The automatic transmission apparatus 25 is so configured that under a control of the control unit 17, the actuator mechanism 64 can be controlled according to output signals from sensors as well as the mode switch 132b and the shift selection switch 132a, thereby the gear position in the transmission 60 can be changed automatically or semi-automatically.

Specifically, in the automatic transmission mode, the actuator mechanism 64 is controlled on the basis of vehicle speed and the like, and a gear change (shift) in the transmission 60 is performed automatically. In the manual transmission mode, the driver operates the shift selection switch 132a to make a gear shift.

The transmission 60 transmits rotation, supplied from the change clutch 61, to the rear wheel 13 with a speed change on the basis of a command from the control unit 17. The transmission 60 includes: a main shaft 65 as an input shaft; a countershaft 66 disposed in parallel to the main shaft 65; driving gears 67a, 67b, 67c and 67d (a row of driving gears) provided on the main shaft 65; and driven gears 68a, 68b, 68c and 68d (a row of driven gears) provided on the countershaft 66. The driving gears 67a, 67b, 67c and 67d and the driven gears 68a, 68b, 68c and 68d are constant-mesh type gears.

The driving gears 67a, 67b, 67c and 67d are in mesh with the driven gears 68a, 68b, 68c and 68d in this order. The driving gear 67b has dog teeth on a side surface thereof to be engaged with the adjacent driving gear 67a or 67c when the driving gear 67b is slid to the left or the right. The driven gear 68c has dog teeth on a side surface thereof to be engaged with the adjacent driven gear 68b or 68d when the driven gear 68c is slid to the left or the right.

The driving gears 67a and 67c (driving-side free gears) and the driven gears 68b and 68d (driven-side free gears) are free gears which are relatively rotatably retained on, and axially movable relative to, the main shaft 65 and the countershaft 66, respectively.

The driving gear 67b (driving-side shifter gear) and the driven gear 68c (driven-side shifter gear) are shifter gears which are non-rotatably spline-coupled to, and axially slidable relative to, the main shaft 65 and the countershaft 66, respectively.

The driving gear 67d and the driven gear 68a are fixed gears which are fixed to the main shaft 65 and the countershaft 66, respectively.

For example, when the driving gear 67b (which is a shifter gear) is slid toward the side of the driving gear 67c (which is a free gear) by the gear change mechanism 63, the dog teeth 67b1 and 67c1 erected on opposed side surfaces of the driving gear 67b and the driving gear 67c mesh with each other at their side portions, whereby the driving gear 67b and the driving gear 67c are connected. As a result, the driving gear 67c (a free gear) is non-rotatably fixed on the main shaft 65 by the driving gear 67b which is non-rotatable relative to the main shaft 65, and a shift position defined by the driving gear 67c and the driven gear 68c is established. The dog teeth 67b1 and 67c1 are formed in pluralities at intervals along the circumferential direction, and constitute a dog clutch 67Dc for connecting the driving gear 67b and the driving gear 67c in an engageable and disengageable manner.

In addition, the driven gear 68c and the driven gear 68b are provided with dog teeth 68c1 and 68b1 erected from their opposed side surfaces. The dog teeth 68c1 and 68b1 are provided in pluralities at intervals along the circumferential direction, and constitute a dog clutch 68Dc by which the driven gear 68c and the driven gear 68b are coupled to each other in an engageable and disengageable manner.

In addition, the driving gear 67b and the driving gear 67a are connected, and the driven gear 68c and the driven gear 68d are connected, through respective similar dog clutches provided on their side surfaces in an engageable and disengageable manner.

The main shaft 65 is rotatably supported by bearings 71a and 71b, and the countershaft 66 is rotatably supported by bearings 71c and 71d.

A drive sprocket 72 is provided at an end portion of the countershaft 66. The drive sprocket 72 transmits rotation to the rear wheel 13 through the chain 15. In addition, a countershaft rotary speed sensor 73 (FIG. 9) adapted to detect rotary speed of the countershaft 66 in a non-contact manner is provided in the vicinity of the countershaft 66. The control unit 17 calculates the vehicle speed from a value detected by the countershaft rotary speed sensor 73. Further, a main shaft rotary speed sensor 65a (FIG. 9) adapted to detect rotary speed of the main shaft 65 in a non-contact manner is provided in the vicinity of the main shaft 65.

Figure 3:
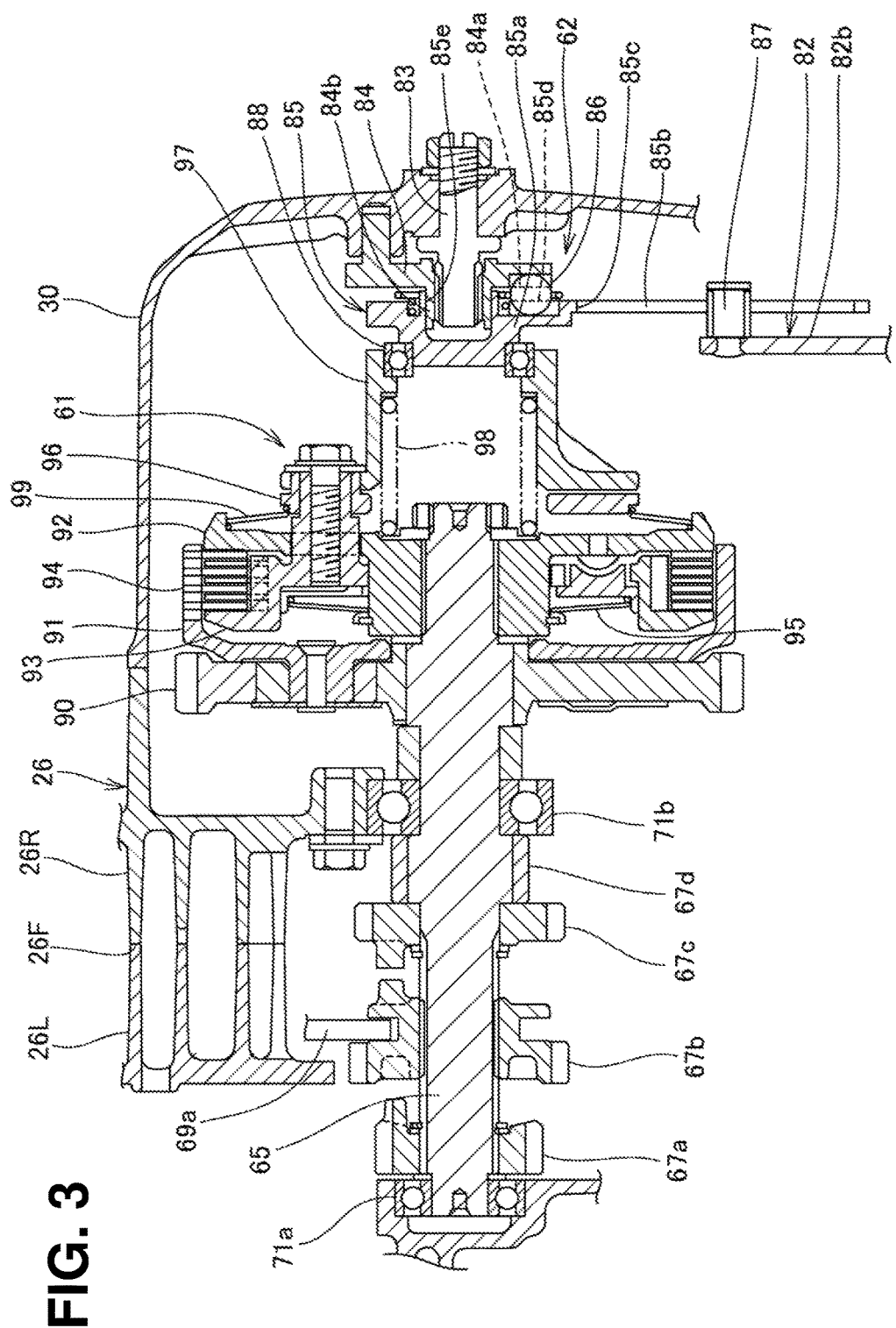
FIG. 3 is a sectional view showing a gear change mechanism, an actuator mechanism, a change clutch and a clutch operation mechanism.

FIG. 3 is a sectional view showing the change clutch 61 and the clutch operation mechanism 62.

Referring to FIGS. 2 and 3, the actuator mechanism 64 includes: a shift motor 75 (motor) as an actuator; a shift spindle 76 (spindle member) extending in the transverse direction within the crankcase 26; and a speed reduction gear train 77 adapted to transmit the rotation of the shift motor 75 with speed reduction to drive the shift spindle 76. One end in the axial direction of the speed reduction gear train 77 is supported on an outside surface of the wall portion 37 of the one-side case half 26L, and the other end is supported by a cover 78 covering the wall portion 37 from an outer side.

The shift spindle 76 is provided to extend through the inside of the clutch chamber 34. The shift spindle 76 is rotatably supported at its both ends by bearings 78a and 30a provided at the cover 78 and the clutch cover 30, respectively. In addition, the shift spindle 76 is rotatably supported at its intermediate portion by a bearing 37b provided at the wall portion 37 of the one-side case half 26L. A shift spindle angle sensor 79 (spindle angle sensor) adapted to detect rotary position of the shift spindle 76 is provided on the clutch cover 30.

The gear change mechanism 63 includes: a change mechanism 89 adapted to slide the driving gear 67b and the driven gear 68c to thereby change a shift position; and a force accumulation mechanism 81 by which a force is accumulated in a force accumulation spring 145 (FIG. 10) (described later) by rotation of the shift spindle 76 and is thereafter released to rotate the change mechanism 89 at a stroke. The shift spindle 76 is shared by the gear change mechanism 63 and the clutch operation mechanism 62.

The change mechanism 89 includes: a master arm 80 supported by the shift spindle 76 and rotated by the force accumulation mechanism 81; a shift drum 70 (FIG. 13) rotated interlockedly with rotation of the master arm 80; shift forks 69a and 69b adapted to connect the shift drum 70 to the driving gear 67b and the driven gear 68c which are shifter gears; and a support shaft (not shown) adapted to hold the shift forks 69a and 69b in an axially slidable manner.

The shift drum 70 is provided in its outer circumferential portion with a plurality of lead grooves 70a (FIG. 13) shaped according to shift patterns. One-side ends (end portions) of the shift forks 69a and 69b are connected to the lead grooves 70a.

When the shift drum 70 is driven by the actuator mechanism 64 to rotate, the shift forks 69a and 69b are moved in the axial direction along the lead grooves 70a of the shift drum 70, whereby the driving gear 67b and the driven gear 68c are slid according to a shift position.

In the transmission 60, according to sliding of the driving gear 67b and the driven gear 68c, either a neutral condition or a condition of power transmission through selective use of any one of first-speed to fourth-speed transmission gear pairs can be established between the main shaft 65 and the countershaft 66.

The clutch operation mechanism 62 includes: a clutch lever 82 fixed onto the shift spindle 76; a support shaft 83 fixed to an inside surface of the clutch cover 30 in a positional relation such as to be substantially coaxial with the main shaft 65; a plate-shaped base member 84 fixed to the support shaft 83; a lifter cam plate 85 as an operating member which is connected to the clutch lever 82 and is opposed to the base member 84; and a plurality of balls 86 retained between the lifter cam plate 85 and the base member 84.

The clutch lever 82 includes: a cylindrical portion 82a provided on the shift spindle 76 adjacently to the force accumulation mechanism 81; and a lever portion 82b extending radially outward from the cylindrical portion 82a. The clutch lever 82 is rotated as one body with the shift spindle 76.

The lifter cam plate 85 includes: a pressing operation portion 85a facing the base member 84; a connection arm portion 85b extending from the pressing operation portion 85a and connected to the lever portion 82b of the clutch lever 82; and a cam hole 85c formed in the connection arm portion 85b. The lifter cam plate 85 is connected to the clutch lever 82 by a structure in which a pin 87 provided at the tip of the lever portion 82b of the clutch lever 82 is inserted in the cam hole 85c.

Opposed surfaces of the pressing operation portion 85a and the base member 84 are formed with slant surface-shaped cam portions 85d and 84a, respectively. The balls 86 are retained between the cam portions 85d and 84a. The lifter cam plate 85 is guided in regard of its axial movement by a structure in which a guide shaft 84b of the base member 84 is fitted in a guide hole 85e formed in the center of the lifter cam plate 85. Besides, a ball bearing 88 is provided at a tip portion of the pressing operation portion 85a. The lifter cam plate 85 is connected to the change clutch 61 through the ball bearing 88.

When the clutch lever 82 is rotated, the lifter cam plate 85 is rotated about the guide shaft 84b through the pin 87, and is moved (lifted) in the axial direction through sliding of the cam portion 85d relative to the balls 86. The change clutch 61 is engaged and disengaged interlockedly with the axial movement of the lifter cam plate 85. The lifter cam plate 85 is moved in a clutch-disengaging direction irrespectively of whether the rotation of the shift spindle 76 from a normal position is in a shift-up direction or in a shift-down direction.

Figure 4:
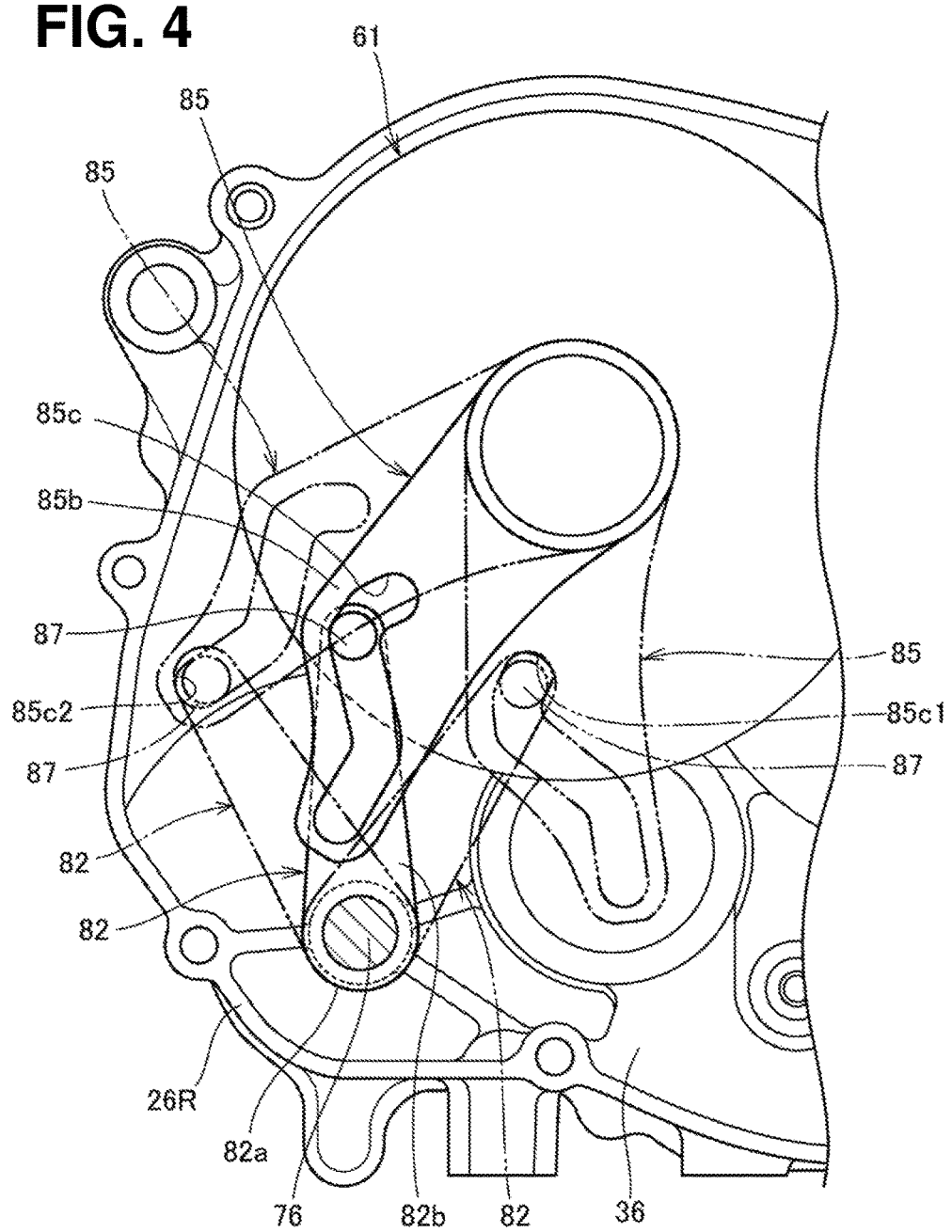
FIG. 4 is a side view showing an operating condition of a clutch lever and a lifter cam plate.

FIG. 4 is a side view showing an operating condition of the clutch lever 82 and the lifter cam plate 85.

The cam hole 85c of the lifter cam plate 85 is formed in a shape of being bent along a longitudinal direction of the connection arm portion 85b. As the shift spindle 76 rotates, the pin 87 of the clutch lever 82 moves within the cam hole 85c, whereby the lifter cam plate 85 is rotated. In other words, the axial moving amount of the lifter cam plate 85 per unit rotary amount can be set by the shape of the cam hole 85c, whereby engagement/disengagement characteristics of the change clutch 61 can be adjusted.

The shift spindle 76 is in a neutral position at normal times when neither a shift-up operation nor a shift-down operation is being conducted. In the neutral position, the clutch lever 82 extends upward substantially vertically from the shift spindle 76, and the pin 87 is located at an intermediate portion of the cam hole 85c.

In the case of shifting-up, the shift spindle 76 is rotated clockwise in FIG. 4 (in a shift-up direction) from the neutral position, and the pin 87 is located at an inner end portion 85c1 of the cam hole 85c.

In the case of shifting-down, the shift spindle 76 is rotated counterclockwise in FIG. 4 (in a shift-down direction) from the neutral position, and the pin 87 is located at an outer end portion 85c2 of the cam hole 85c.

In the case of shifting-up, the control unit 17 rotates the shift motor 75 so as to rotate the shift spindle 76 in a shift-up direction. Attendant on the rotation of the shift spindle 76, force accumulation in the force accumulation mechanism 81 is started. When the shift spindle 76 is rotated a predetermined amount, the change clutch 61 is disengaged by rotation of the clutch lever 82. Attendant on the disengagement of the change clutch 61, the accumulated force is released, and the master arm 80 is turned to rotate the shift drum 70, whereby the gear position is shifted up by one position.

On the other hand, in the case of shifting-down, the control unit 17 rotates the shift motor 75 so as to rotate the shift spindle 76 in a shift-down direction. At the time of shifting-down, force accumulation by the force accumulation mechanism 81 is not performed. At the time of shifting-down, attendant on the rotation of the shift spindle 76, the clutch lever 82 is rotated to disengage the change clutch 61. Thereafter, the master arm 80 is turned in a shift-down direction. As a result, the shift drum 70 is rotated, and the gear position is shifted down by one position.

In the cases of shifting-up and shifting-down, the shift spindle 76 is rotated reversely after the shifting operation, whereby the master arm 80 is returned into a neutral position, and the change clutch 61 is engaged.

In the present embodiment, both the gear change mechanism 63 and the clutch operation mechanism 62 are driven by the single shift spindle 76 rotated by the single shift motor 75. Therefore, only one shift motor 75 is needed, which enables a simplified structure.

As shown in FIG. 2, a primary driven gear 90 for meshing with the primary gear 47 on the crankshaft 23 side is provided on an end of the main shaft 65 extending into the clutch chamber 34. The primary driven gear 90 is supported to be rotatable relative to the main shaft 65. The change clutch 61 is connected to the primary driven gear 90.

Figure 5:
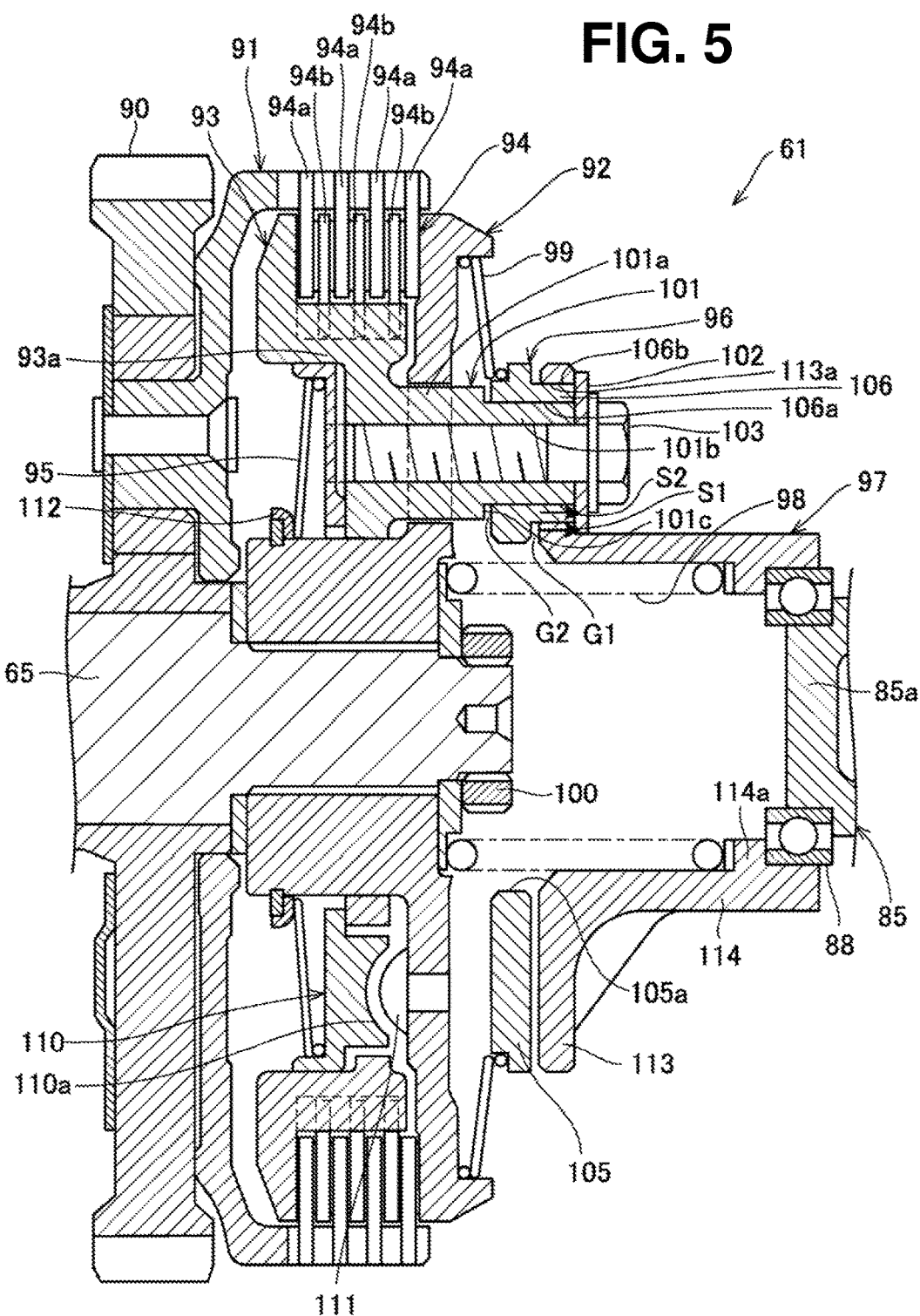
FIG. 5 is a sectional view of the change clutch.

FIG. 5 is a sectional view of the change clutch 61. Here, FIG. 5 illustrate a state in which the change clutch 61 has been completely engaged.

The change clutch 61 includes: a cup-shaped clutch outer 91 fixed to the primary driven gear 90; a disc-shaped clutch center 92 provided on a radially inner side of the clutch outer 91 and integrally fixed to the main shaft 65; a pressure plate 93 provided on a radially inner side of the clutch outer 91 and movable in the axial direction of the main shaft 65; clutch discs 94 provided between the pressure plate 93 and the clutch center 92; a main spring 95 biasing the pressure plate 93 in a clutch-engaging direction; a lifter plate 96 disposed between the clutch center 92 and the lifter cam plate 85; and a sub lifter plate 97 disposed between the lifter plate 96 and the lifter cam plate 85.

In addition, the change clutch 61 includes: a sub spring 98 retained between the clutch center 92 and the sub lifter plate 97; a second sub spring 99 held between the clutch center 92 and the lifter plate 96; and a back torque limiting member 110.

The clutch center 92 and the pressure plate 93 are combined with each other to form an integral body, which constitutes a clutch inner disposed on the inside of the clutch outer 91.

The clutch outer 91 is integrally fixed onto an outside surface of the primary driven gear 90. The clutch outer 91 can be rotated relative to the main shaft 65, as one body with the primary driven gear 90.

The clutch center 92 is fixed by a nut 100 in the state of being spline-coupled to the main shaft 65. The clutch center 92 is non-rotatable and axially non-movable relative to the main shaft 65.

The pressure plate 93 is disposed on the inside of a cylindrical portion of the clutch outer 91, and is fitted to a shaft portion of the clutch center 92 so as to be movable in the axial direction. The pressure plate 93 is provided with a plurality of cylindrical release bosses 101 which penetrate the clutch center 92 and are connected to the lifter plate 96.

The clutch discs 94 are clamped between the clutch center 92 and the pressure plate 93.

The clutch discs 94 include outside frictional discs 94a provided on the clutch outer 91, and inside frictional discs 94b provided on the clutch center 92. The outside frictional discs 94a and the inside frictional discs 94b are disposed in pluralities and in an alternately stacked state, between the pressure plate 93 and the clutch center 92. Each of the outside frictional discs 94a is supported on the cylindrical portion of the clutch outer 91 through spline fitting, and is provided to be axially movable but non-rotatable relative to the clutch outer 91.

Each of the inside frictional discs 94b is supported on an outer circumferential portion of an inside cylindrical portion 93a of the pressure plate 93 through spline fitting, and is provided to be axially movable but non-rotatable relative to the pressure plate 93.

The back torque limiting member 110 is formed in a plate-like shape, and is fixed on the inside of the inside cylindrical portion 93a of the pressure plate 93 as one body with the pressure plate 93.

The back torque limiting member 110 and a lifter pin 111, which is fixed to the clutch center 92, constitute a back torque limiter mechanism. The back torque limiter mechanism is a known one as described, for example, in Japanese Patent Laid-Open No. 1996-93786. The back torque limiter mechanism is a mechanism which brings a clutch from an engaged state into a partial clutch engagement state in the case where a torque of not less than a predetermined value is exerted in a direction opposite to a forward power transmission direction.

The back torque limiting member 110 has a cam portion 110a which penetrates the pressure plate 93 to engage with the lifter pin 111. When a back torque of not less than a predetermined value acts from the rear wheel 13 side, the pressure plate 93 rotates relative to the clutch center 92, whereby the cam portion 110a is slid on the lifter pin 111, and the pressure plate 93 is moved in a clutch-disengaging direction. According to the back torque limiter mechanism, a shift shock arising from a back torque can be reduced.

The main spring 95 is retained between a retainer 112 provided on the clutch center 92 and the back torque limiting member 110. The main spring 95 biases the pressure plate 93 in a direction for clamping the clutch discs 94 between the pressure plate 93 and the clutch center 92, namely, in a clutch-engaging direction.

Each release boss 101 of the pressure plate 93 is provided at its tip portion with a guide shaft portion 101b formed to be smaller in diameter than a base end portion 101a. A stopper plate 102 larger in diameter than the guide shaft portion 101b is fastened to a tip surface of the guide shaft portion 101b by a bolt 103. The base end portion 101a is formed at its tip surface with a stepped portion 101c opposed to the stopper plate 102.

The lifter plate 96 includes: a plate-shaped ring portion 105 opposed to the clutch center 92; a spring passing hole 105a provided in the center of the ring portion 105; and lifter plate side bosses 106 projecting from the ring portion 105 toward the lifter cam plate 85 side.

A plurality of the lifter plate side bosses 106 are formed at substantially regular intervals along the circumferential direction of the lifter plate 96. Each lifter plate side boss 106 is formed in a cylindrical shape penetrating the ring portion 105. The lifter plate side boss 106 includes a hole 106a in which the guide shaft portion 101b of the release boss 101 is inserted, and an outer circumferential portion 106b to which the sub lifter plate 97 is fitted.

The lifter plate 96 is assembled with the lifter plate side bosses 106 slidably fitted in the guide shaft portions 101b of the release bosses 101. The lifter plate 96 is disposed between the stopper plate 102 and the stepped portion 101c.

The second sub spring 99 is clamped between an outside surface of the clutch center 92 and the lifter plate 96, biasing the lifter plate 96 so as to press the lifter plate 96 against the stopper plate 102 side. In a clutch engaged state, the lifter plate 96 is so disposed that a gap G2 is formed between its ring portion 105 and the stepped portion 101c, as the tip surface of the guide shaft portion 101b is put into contact with the stopper plate 102 by a biasing force of the second sub spring 99.

In other words, the second sub spring 99 is pressing the pressure plate 93 against the clutch center 92 side through the lifter plate 96 and the stopper plate 102, thereby biasing the pressure plate 93 in a clutch-engaging direction.

The sub lifter plate 97 includes: a ring-shaped pressing plate portion 113 opposed to the lifter plate 96; and a cylindrical circular pipe-shaped portion 114 projecting from an inner circumferential edge at the center of the pressing plate portion 113 toward the lifter cam plate 85 side. The circular pipe-shaped portion 114 is provided substantially coaxially with the main shaft 65.

The pressing plate portion 113 is provided with holes 113a in which to fit the lifter plate side bosses 106 of the lifter plate 96. A plurality of the holes 113a are provided at positions corresponding to the respective lifter plate side bosses 106. The ball bearing 88 is fitted to a tip portion of the circular pipe-shaped portion 114.

The sub lifter plate 97 is assembled with the holes 113a slidably fitted to the lifter plate side bosses 106 of the lifter plate 96. The pressing plate portion 113 of the sub lifter plate 97 is disposed between the stopper plate 102 and the ring portion 105 of the lifter plate 96.

The sub spring 98 is retained between the clutch center 92 and a receiving portion 114a formed at the circular pipe-shaped portion 114 of the sub lifter plate 97, biasing the sub lifter plate 97 so as to press the sub lifter plate 97 against the stopper plate 102 side.

In a clutch engaged state, the sub lifter plate 97 has its pressing plate portion 113 put in contact with the stopper plate 102 by a biasing force of the sub spring 98, with a gap G1 formed between the pressing plate portion 113 and the ring portion 105.

In other words, the sub spring 98 is pressing the pressure plate 93 against the clutch center 92 side through the stopper plate 102, thereby biasing the pressure plate 93 in a clutch-engaging direction.

In a clutch engaged state as depicted in FIG. 5, the clutch discs 94 are clamped by biasing forces of the main spring 95, the second sub spring 99 and the sub spring 98. In this state, the rotation of the clutch outer 91 rotated by the primary gear 47 can be transmitted through the clutch discs 94 to the clutch center 92, and the main shaft 94 is rotated as one body with the clutch center 92.

When the pressure plate 93 is moved toward the primary driven gear 90 side against the biasing forces of the main spring 95, the second sub spring 99 and the sub spring 98 through the lifter cam plate 85, the clamping of the clutch discs 94 is released, resulting in a clutch disengaged state.

Figure 6:
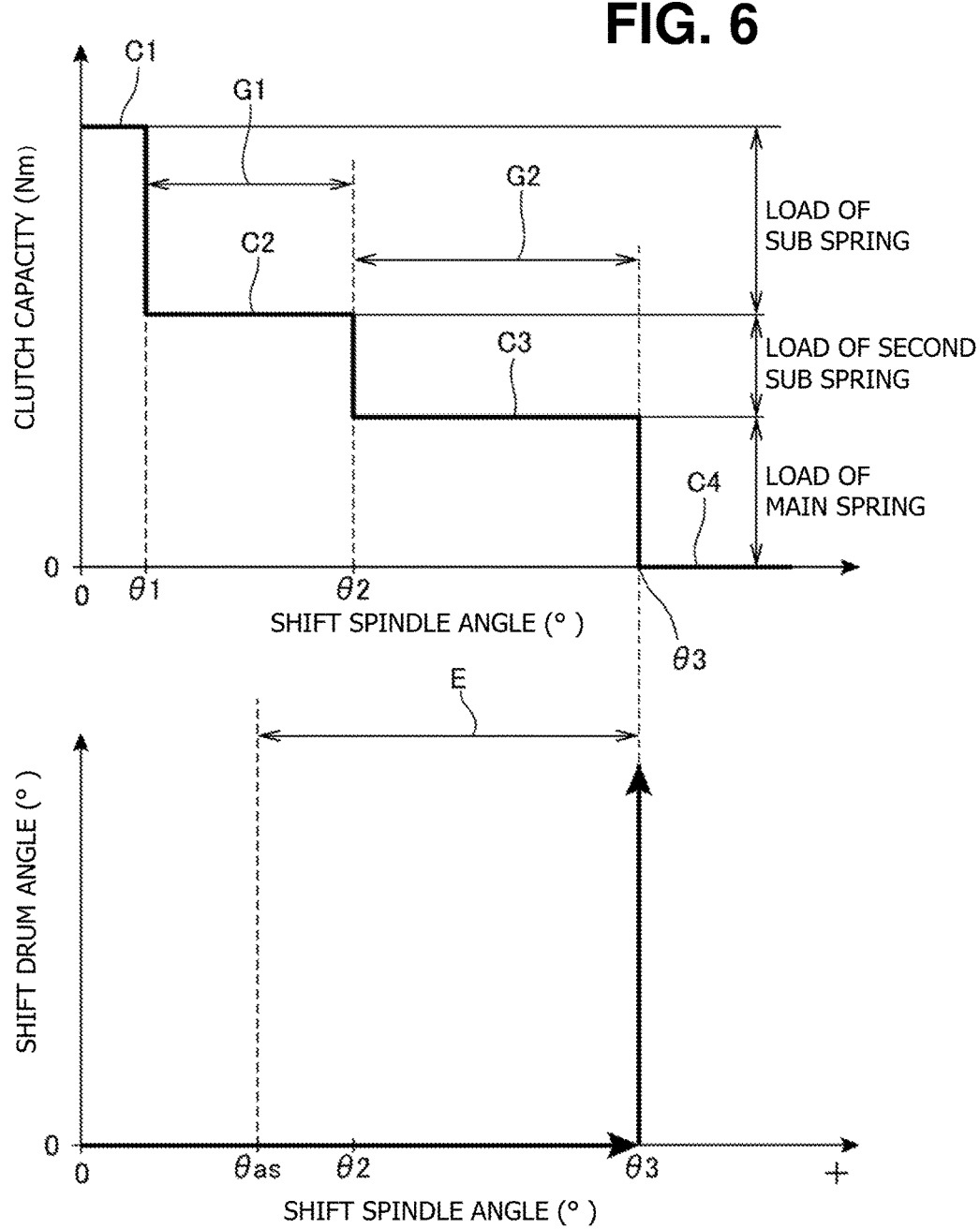
FIG. 6 is a diagram showing a clutch capacity of the change clutch and a rotary angle of a shift drum relative to a rotary angle of a shift spindle.

FIG. 6 is a diagram showing clutch capacity of the change clutch 61 and rotary angle of the shift drum 70 relative to rotary angle of the shift spindle 76. In the following description, a normal direction of rotation of the shift spindle 76 is the shift-up direction, and a negative direction of rotation of the shift spindle 76 is the shift-down direction.

As illustrated in FIG. 6, in this embodiment, the capacity of the change clutch 61 is variable as the springs contributing to the clutch capacity are changed according to the rotary angle of the shift spindle 76. Specifically, the clutch capacity is variable in a plurality of stages including: a maximum capacity C1 (fully engaged state) wherein the clutch capacity is determined by the biasing forces of the main spring 95, the second sub spring 99 and the sub spring 98; a first intermediate capacity C2 (partial clutch engagement state) wherein the clutch capacity is determined by the biasing forces of the main spring 95 and the second sub spring 99; a second intermediate capacity C3 wherein the clutch capacity is determined by the biasing force of only the main spring 95; and a disengagement capacity C4 (clutch disengaged state) wherein the biasing force of the main spring 95 is completely removed. When having the first intermediate capacity C2 and when having the second intermediate capacity C3, the change clutch 61 is in a so-called partial clutch engagement state.

The maximum capacity C1 of the clutch capacity is obtained in the clutch engaged state depicted in FIG. 5. In this state, both the lifter plate 96 and the sub lifter plate 97 are in contact with the stopper plate 102, so that the biasing forces of the second sub spring 99 and the sub spring 98 are transmitted to the pressure plate 93. Therefore, the biasing force with which the pressure plate 93 presses the clutch discs 94 is a sum total of the biasing forces (loads) exerted by the main spring 95, the second sub spring 99 and the sub spring 98, and is at maximum.

In other words, the sub lifter plate 97 and the stopper plate 102 constitute a first sub spring load transmission path S1 along which the biasing force of the sub spring 98 is transmitted to the pressure plate 93. In addition, the lifter plate 96 and the stopper plate 102 constitute a second sub spring load transmission path S2 along which the biasing force of the second sub spring 99 is transmitted to the pressure plate 93.

When the lifter cam plate 85 is moved in a clutch-disengaging direction attendant on the rotation of the shift spindle 76 by the actuator mechanism 64 (FIG. 2), the sub lifter plate 97 is lifted along the lifter plate side bosses 106 toward the ring portion 105 side against the biasing force of the sub spring 98, thereby being separated from the stopper plate 102.

With the angle of the shift spindle 76 being the rotary angle θ1 (FIG. 6) and with the sub lifter plate 97 separated from the stopper plate 102, the first sub spring load transmission path S1 is interrupted. In this state, the biasing force of the sub spring 98 is not transmitted to the pressure plate 93, and the clutch capacity is determined by the main spring 95 and the second sub spring 99. For this reason, as shown in FIG. 6, the clutch capacity is lowered from the maximum capacity C1 to the first intermediate capacity C2 the moment that the sub lifter plate 97 is separated from the stopper plate 102.

When the movement of the lifter cam plate 85 is continued after the sub lifter plate 97 is separated from the stopper plate 102, the sub lifter plate 97 continues moving further toward the ring portion 105 side so as to reduce the gap G1 (FIG. 5). The section from the separation of the pressing plate portion 113 of the sub lifter plate 97 from the stopper plate 102 to the contact thereof with the ring portion 105 is the section of the first intermediate capacity C2. In other words, the first intermediate capacity C2 is obtained in the section of lift amount of the lifter cam plate 85 corresponding to the magnitude of the gap G1.

In the section of the first intermediate capacity C2, the movement of the sub lifter plate 97 is a movement relative to the ring portion 105, and does not influence the loads of the main spring 95 and the second sub spring 99. For this reason, as shown in FIG. 6, in the section of the first intermediate capacity C2, the clutch capacity is determined by the main spring 95 and the second sub spring 99, and the first intermediate capacity C2 is constant. In the present embodiment, a play owing to the gap G1 is provided, so that the section in which the first intermediate capacity C2 is obtained can be elongated. Accordingly, the intermediate capacity of the clutch can be easily adjusted to a set point, without enhancing the accuracy of component parts or a control technique.

When the lifter cam plate 85 is lifted further in the clutch-disengaging direction from the state of the first intermediate capacity C2, the pressing plate portion 113 of the sub lifter plate 97 comes into contact with the ring portion 105, whereon the section of the first intermediate capacity C2 ends. Thereafter, when the lifter cam plate 85 is moved further in the clutch-disengaging direction, the lifter plate 96 is pressed through the sub lifter plate 97, and is lifted along the guide shaft portion 101*b* toward the stepped portion 101*c* side against the biasing force of the second sub spring 99, to be separated from the stopper plate 102.

With the angle of the shift spindle 76 being the rotary angle θ2 (FIG. 6) and with the tips of the lifter plate side bosses 106 of the lifter plate 96 separated from the stopper plate 102, the second sub spring load transmission path S2 is interrupted, resulting in that the biasing force of the second sub spring 99 is not transmitted to the pressure plate 93 any more. In this state, the clutch capacity is determined by only the main spring 95. For this reason, as shown in FIG. 6, the clutch capacity is lowered from the first intermediate capacity C2 to the second intermediate capacity C3 the moment that the lifter plate 96 is separated from the stopper plate 102.

When the movement of the lifter cam plate 85 is continued after the lifter plate 96 is separated from the stopper plate 102, the lifter plate 96 continues moving further toward the stepped portion 101*c* side so as to reduce the gap G2. The section from the separation of the lifter plate 96 from the stopper plate 102 to the contact thereof with the stepped portion 101*c* is the section of the second intermediate capacity C3. In other words, the second intermediate capacity C3 is obtained in the section of lift amount of the lifter cam plate 85 corresponding to the magnitude of the gap G2.

In the section of the second intermediate capacity C3, the movement of the lifter plate 96 is a movement relative to the stepped portion 101*c*, and does not influence the load of the main spring 95. For this reason, as shown in FIG. 6, in the section of the second intermediate capacity C3, the clutch capacity is determined by only the main spring 95, and the second intermediate capacity C3 is constant. In the present embodiment, a play owing to the gap G2 is provided, so that the section in which the second intermediate capacity C3 is obtained can be elongated. Accordingly, the intermediate capacity of the clutch can be easily adjusted to a set point, without enhancing the accuracy of component parts or a control technique.

When the lifter cam plate 85 is further lifted in the clutch-disengaging direction from the state of the second intermediate capacity C3, the lifter plate 96 comes into contact with the stepped portion 101*c*, whereon the section of the second intermediate capacity C3 ends. Thereafter, with the angle of the shift spindle 76 being the rotary angle θ3 (FIG. 6) and with the lifter cam plate 85 further moved in the clutch-disengaging direction, the pressure plate 93 is pressed through the sub lifter plate 97 and the lifter plate 96. As a result, the pressure plate 93 is moved in the clutch-disengaging direction against the biasing force of the main spring 95, so that the pressure plate 93 is separated from the clutch discs 94, and the clutch is disengaged.

At the time of an automatic shift, the control unit 17 selects a clutch capacity with which the shift shock can be reduced by driving the actuator mechanism 64 on the basis of the torque of the countershaft 66. The selection of the clutch capacity can be performed by controlling the shift spindle 76 to a predetermined rotary angle. For example, at the time of shifting-up from the first speed to the second speed, the control unit 17 selects one of the maximum capacity C1, the first intermediate capacity C2 and the second intermediate capacity C3 so as to reduce the shift shock, on the basis of a pre-shift torque of the countershaft 66 detected. Then, after changing the gear train in the transmission 60, the control unit 17 causes the change clutch 61 to be engaged at the selected clutch capacity. Specifically, the clutch capacity is so selected that the clutch capacity of the change clutch 61 will be within a band between the pre-shift torque of the countershaft 66 and the post-shift torque of the countershaft 66 or be at a value not deviated significantly from the band.

By this control, the rotary difference between the countershaft 66 side and the crankshaft 23 side can be appropriately absorbed by the change clutch 61, and the shift shock can be reduced. Here, the pre-shift and post-shift torques of the countershaft 66 can be obtained on the basis of a map in which relationships between engine rotary speed, throttle position and the torque of the countershaft 66 are stored.

Figure 7:
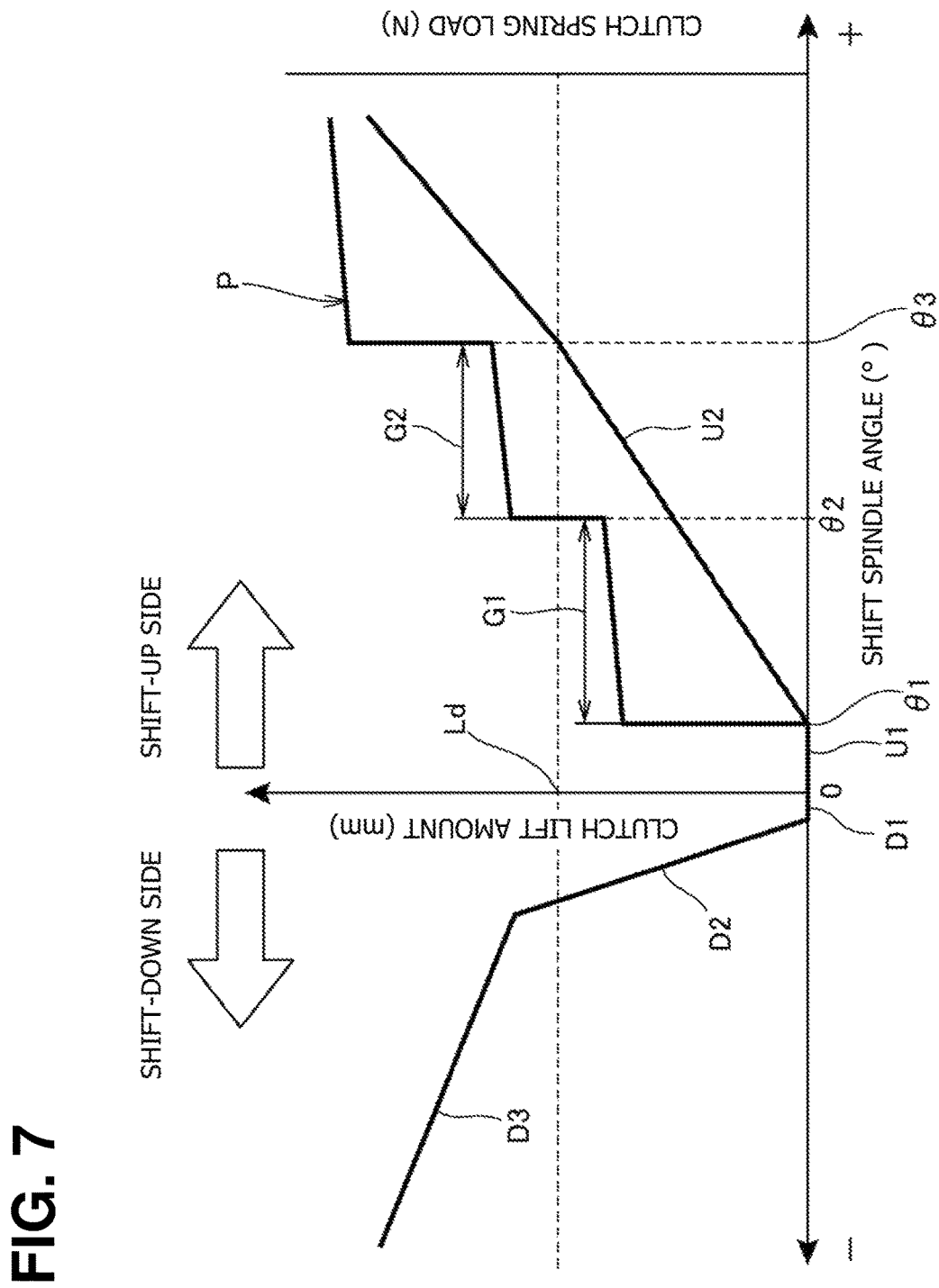
FIG. 7 is a diagram showing a lift amount of the lifter cam plate relative to the rotary angle of the shift spindle.

FIG. 7 is a diagram showing lift amount of the lifter cam plate 85 (clutch lift amount) relative to rotary angle of the shift spindle 76. Besides, in FIG. 7, on the shift-up side, load of the clutch spring relative to the rotary angle of the shift spindle 76 is shown.

As shown in FIG. 7, lift characteristics of the lifter cam plate 85 on the shift-up side include a play section U1 wherein the lift amount does not increase in response to rotation of the shift spindle 76 from a neutral position (0°)

to a predetermined angle, and a lift section U2 wherein the lift amount increases substantially linearly with an increase in the rotary amount of the shift spindle 76.

Lift characteristics of the lifter cam plate 85 on the shift-down side include a play section D1 wherein the lift amount does not increase in response to rotation of the shift spindle 76 from the neutral position (0°) to a predetermined angle, a lift section D2 wherein the lift amount increases substantially linearly with an increase in the rotary angle of the shift spindle 76, and a lift section D3 wherein the lift amount increases substantially linearly, and at a gradient smaller than that in the lift section D2, with an increase in the rotary angle of the shift spindle 76.

The play section D1 is set smaller than the play section U1. In the lift section D2, the lift amount of the lifter cam plate 85 increases at a gradient greater than that in the lift section U2.

The lift characteristics of the lifter cam plate 85 are set to desired characteristics by regulating the shapes of the cam hole 85c of the lifter cam plate 85 and the cam hole 85c of the clutch lever 82. In the present embodiment, a setting is made such that the lift amount of the lifter cam plate 85 increases linearly with an increase in the rotary amount of the shift spindle 76.

Load P of the clutch spring on the shift-up side shown in FIG. 7 is a reaction force that the lifter cam plate 85 receives from the change clutch 61 when the shift spindle 76 is rotated in the shift-up direction, that is, a force required for progressively disengaging the change clutch 61. Since variations in the load P correspond to variations in the clutch capacity shown in FIG. 6, the corresponding sections are denoted by the same reference symbols as used above. The load P increases stepwise correspondingly to the stepwise reduction in the clutch capacity.

The rotary angle θ3 reached when the shift spindle 76 is rotated slightly in the clutch-disengaging direction after the gap G2 is reduced to zero is a rotary position of the shift spindle 76 at which the clutch is disengaged. The lift amount of the lifter cam plate 85 at the rotary angle θ3 is a disengagement lift amount Ld at which the clutch is disengaged.

The disengagement lift amount Ld is the same in both the shift-up direction and the shift-down direction. In the lift section D2, the lift amount of the lifter cam plate 85 increases more rapidly than in the lift section U2. Therefore, in the shift-down direction, the clutch is disengaged at a smaller rotary amount of the shift spindle 76 than that in the shift-up direction.

As shown in FIG. 6, at the time of shifting-up, accumulation of a force by the force accumulation mechanism 81 is started at a stage before disengagement of the clutch. At the rotary angle θ3, the clutch is disengaged, whereby restraint on the change mechanism 89 by the transmission 60 is released, and the shift drum 70 is rotated at a stroke by the force accumulated in the force accumulation mechanism 81, resulting in a shift-up. A force accumulation section E in which a force is accumulated in the force accumulation mechanism 81 is the section from a rotary angle θ as between the rotation angle θ1 and the rotary angle θ2 to the rotary angle θ3.

Figure 8:
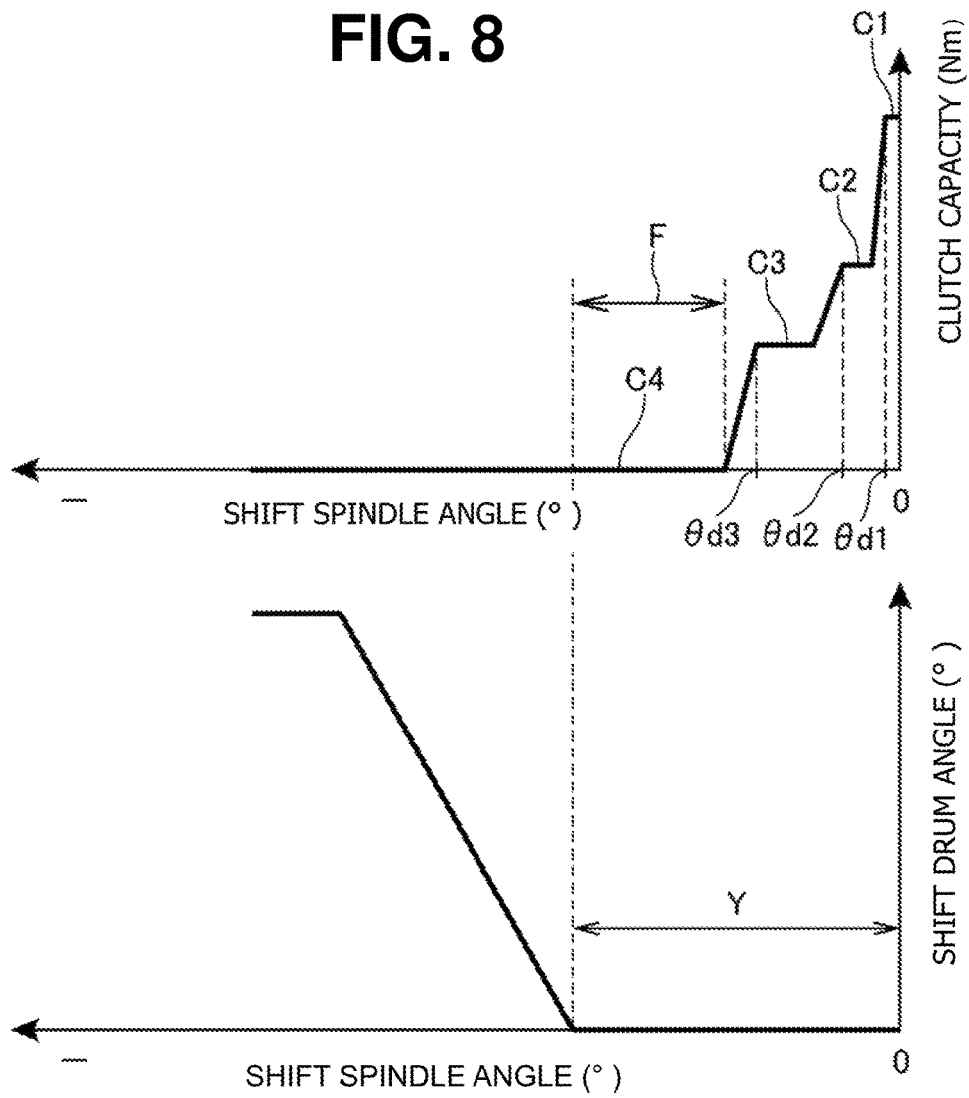
FIG. 8 is a diagram showing the clutch capacity of the change clutch and the rotary angle of the shift drum relative to the rotary angle of the shift spindle during a shift-down.

FIG. 8 is a diagram showing clutch capacity of the change clutch 61 and rotary angle of the shift drum 70 in relation to rotary angle of the shift spindle 76 at the time of shifting-down.

At the time of shifting-down, stepwise control of clutch capacity is not conducted, and, in response to rotation of the shift spindle 76, the change clutch 61 is disengaged to the disengagement capacity C4 at a stroke.

When the shift spindle 76 is rotated in the shift-down direction by a predetermined amount F after the change clutch 61 is completely disengaged, rotation of the shift drum 70 is started through the master arm 80, and a shift-down is performed.

The shift shock upon the shift-down is reduced by the back torque limiter mechanism.

Figure 9:
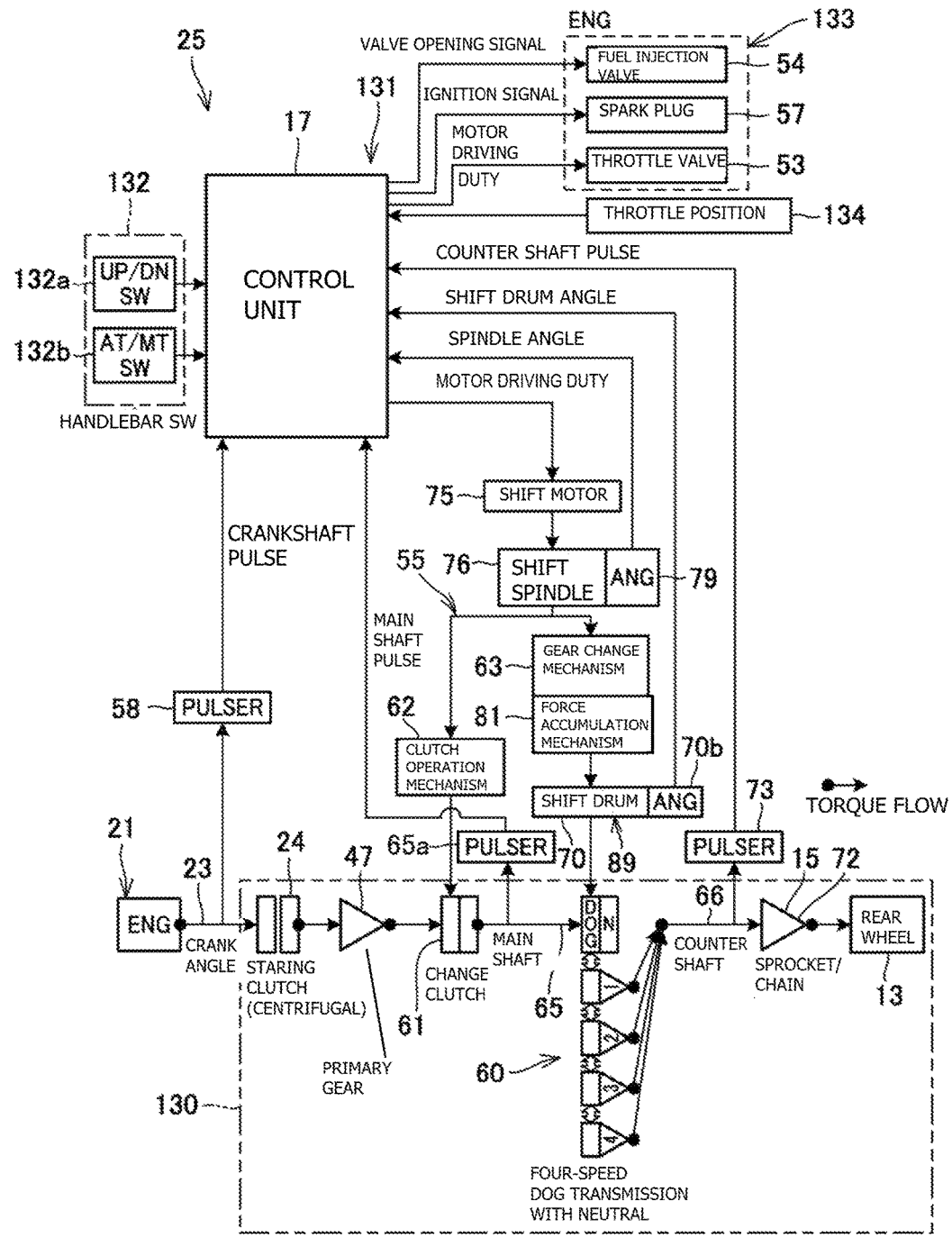
FIG. 9 is a block diagram showing the configuration of the automatic transmission apparatus.

FIG. 9 is a block diagram showing the configuration of the automatic transmission apparatus 25.

As shown in FIG. 9, the automatic transmission apparatus 25 includes: a drive transmission unit 130 including the starting clutch 24, the primary gear 47, the change clutch 61, the main shaft 65, the transmission 60, the countershaft 66, the chain 15, the drive sprocket 72 and the rear wheel 13; an actuator mechanical unit 55 adapted to mechanically operate the transmission 60 and the change clutch 61; an electrical unit 131; and an engine operation control unit 133 adapted to directly control the operation of the engine 21.

The drive transmission unit 130 mechanically transmits the power of the crankshaft 23 to the rear wheel 13.

The actuator mechanical unit 133 includes the shift motor 75, the shift spindle 76, the gear change mechanism 63, the force accumulation mechanism 81, the change mechanism 89, and the clutch operation mechanism 62.

The engine operation control unit 133 includes the throttle valve 53, the fuel injection valve 54, and a spark plug 57.

The throttle valve 53 is an electronically controlled one. Specifically, the throttle valve 53 is driven by a throttle valve driving motor (not shown) controlled by the control unit 17. More specifically, the control unit 17 detects, using a sensor, an operation amount of a throttle grip (not shown) provided on the handlebar 11 and operated by the driver, and drives the throttle valve driving motor according to the operation amount, thereby controlling the position (angle) of the throttle valve 53.

The spark plug 57 is connected to the control unit 17 through an ignition coil driving section and an ignition coil (both not shown).

The electrical unit 131 includes the control unit 17, an engine rotary speed sensor 58, the shift spindle angle sensor 79, a drum angle sensor 70b, a throttle position sensor 134, the countershaft rotary speed sensor 73, the main shaft rotary speed sensor 65a, and a handlebar switch 132 provided on the handlebar 11.

The control unit 17 includes a CPU, and a storage section including a ROM, a RAM and the like. On the basis of control data such as a control map in the storage section, the control unit 17 controls the actuator mechanical unit 55 and the engine operation control unit 133.

The engine rotary speed sensor 58 outputs the rotary speed of the crankshaft 23 to the control unit 17.

The control unit 17 can determine the state of the transmission 60, that is, whether the transmission 60 is being shifted or not, on the basis of the value detected by the shift spindle angle sensor 79.

The drum angle sensor 70b outputs the rotary angle of the shift drum 70 to the control unit 17. On the basis of the rotary angle, the control unit 17 determines the current gear position (current shift position).

The throttle position sensor 134 outputs the position (angle) of the throttle valve 53 to the control unit 17.

The handlebar switch 132 includes the mode switch 132b and the shift selection switch 132a.

On the basis of signals from the engine rotary speed sensor 58, the shift spindle angle sensor 79, the drum angle sensor 70b, the throttle position sensor 134, and the countershaft rotary speed sensor 73, the control unit 17 controls the shift motor 75 to automatically perform a shift operation and a clutch operation.

In addition, the control unit 17 controls the position of the throttle valve 53, the injection amount of the fuel injection valve 54, and the ignition timing of the spark plug 57, according to the operation amount of the throttle grip. In this case, the control unit 17 corrects the position of the throttle valve 53, the injection amount of the fuel injection valve 54, and the ignition timing of the spark plug 57, on the basis of values detected by the throttle position sensor 134, the engine rotary speed sensor 58, the shift spindle angle sensor 79, the drum angle sensor 70b, and the countershaft rotary speed sensor 73.

Figure 10:
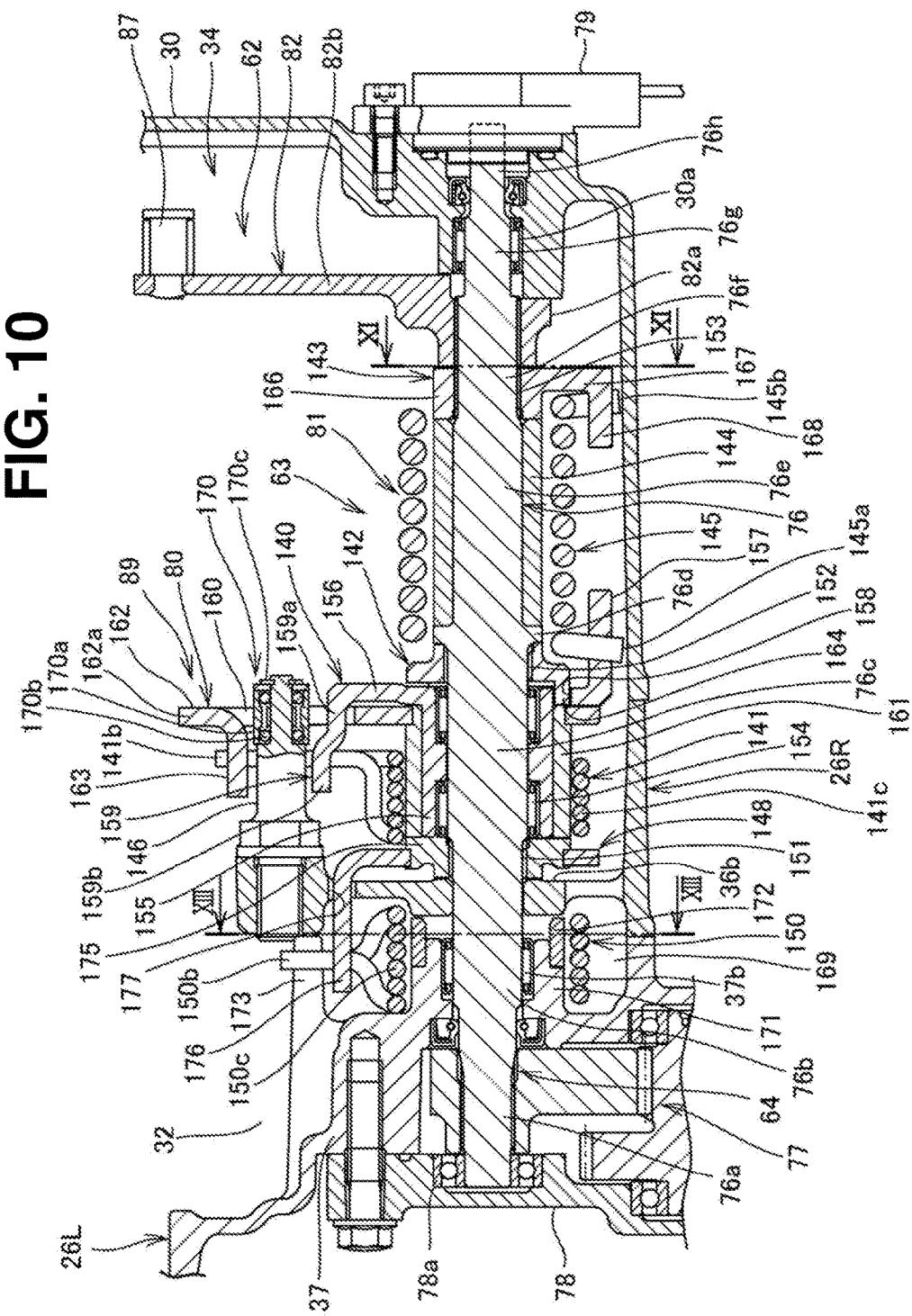
FIG. 10 is a sectional view of a force accumulation mechanism.

FIG. 10 is a sectional view of the force accumulation mechanism 81.

The wall portion 36 of the other-side case half 26R is provided, in the periphery of the shift spindle 76, with an inner wall 36b (inner wall near the faying portion) formed in the vicinity of the faying surface 26F of the crankcase 26.

The force accumulation mechanism 81 is disposed between the inner wall 36b of the wall portion 36 of the other-side case half 26R and the clutch cover 30.

The force accumulation mechanism 81 includes: the shift spindle 76; a gear shift arm 140 provided on a shaft of the shift spindle 76 so as to be rotatable relative to the shift spindle 76; a return spring 141 biasing the gear shift arm 140 toward a neutral position; a shift-down collar 142 fixed on the shaft of the shift spindle 76 at a position proximate to the gear shift arm 140 and rotated as one body with the shift spindle 76; and a force accumulation collar 143 fixed on the shaft of the shift spindle 76 at a position spaced axially from the gear shift arm 140 and rotated as one body with the shift spindle 76.

In addition, the force accumulation mechanism 81 includes: a spring collar 144 provided on the shaft of the shift spindle 76 between the force accumulation collar 143 and the gear shift arm 140 so as to be rotatable relative to the shift spindle 76; a force accumulation spring 145 wound around the outer circumference of the spring collar 144 between the force accumulation collar 143 and the gear shift arm 140; and a stopper pin 146 (stopper portion) adapted to restrict the rotary position of the master arm 80.

The gear change mechanism 63 includes: a sub return spring locking collar 148 fixed on the shift spindle 76 adjacently to the force accumulation mechanism 81; and a sub return spring 150 connected to the sub return spring locking collar 148 and biasing the shift spindle 76 toward a neutral position.

The shift spindle 76 includes, in order from the cover 78 side: a connection portion 76a connected to the speed reduction gear train 77; a support portion 76b supported by the bearing portion 37a and penetrating the inner wall 36b; a gear shift arm support portion 76c supporting the gear shift arm 140; a flange portion 76d projecting radially; a spring collar support portion 76e supporting the spring collar 144; a collar support portion 76f supporting the force accumulation collar 143; a support portion 76g supported by the bearing 30a; and a sensor connection portion 76h connected to the shift spindle angle sensor 79.

Of the shift spindle 76, the flange portion 76d is the largest in diameter, while the gear shift arm support portion 76c, the support portion 76b, and the connection portion 76a are formed to be reduced stepwise in diameter toward the side of the connection portion 76a. In addition, the spring collar support portion 76e, the collar support portion 76f, the support portion 76g, and the sensor connection portion 76h are formed to be reduced stepwise in diameter from the flange portion 76d side toward the sensor connection portion 76h.

The support portion 76b is provided with a locking collar fixing portion 151 to which the sub return spring locking collar 148 is fixed. The gear shift arm support portion 76c is provided, at a position adjacent to the flange portion 76d, with a shift-down collar fixing portion 152 to which the shift-down collar 142 is fixed. The collar support portion 76f is provided with a force accumulation collar fixing portion 153 to which the force accumulation collar 143 is fixed. The locking collar fixing portion 151, the shift-down collar fixing portion 152, and the force accumulation collar fixing portion 153 are serrations formed at an outer circumference of the shift spindle 76. Besides, the clutch lever 82 is fixed to the force accumulation collar fixing portion 153.

The sub return spring locking collar 148, the shift-down collar 142, the force accumulation collar 143, and the clutch lever 82 are fixed to be non-rotatable relative to the shift spindle 76, and are each rotated as one body with the shift spindle 76.

Figure 11:
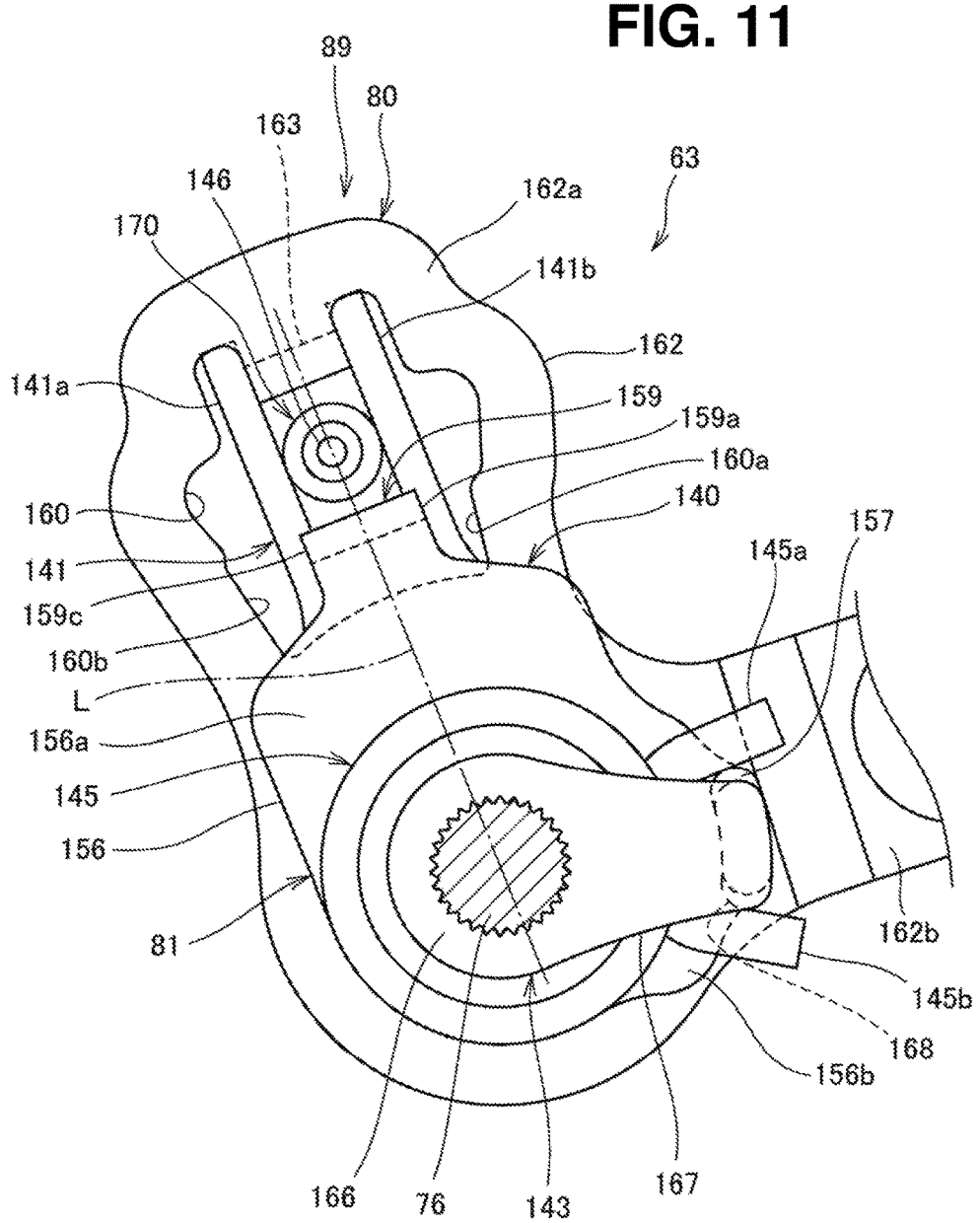
FIG. 11 is a sectional view taken along line XI-XI of FIG. 10, showing a peripheral part of the force accumulation mechanism.
Figure 12A:
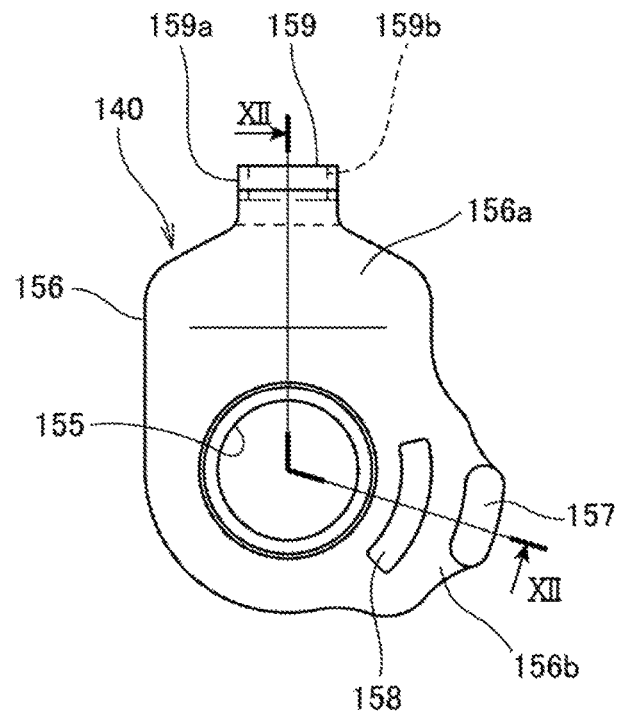
Figure 12B:
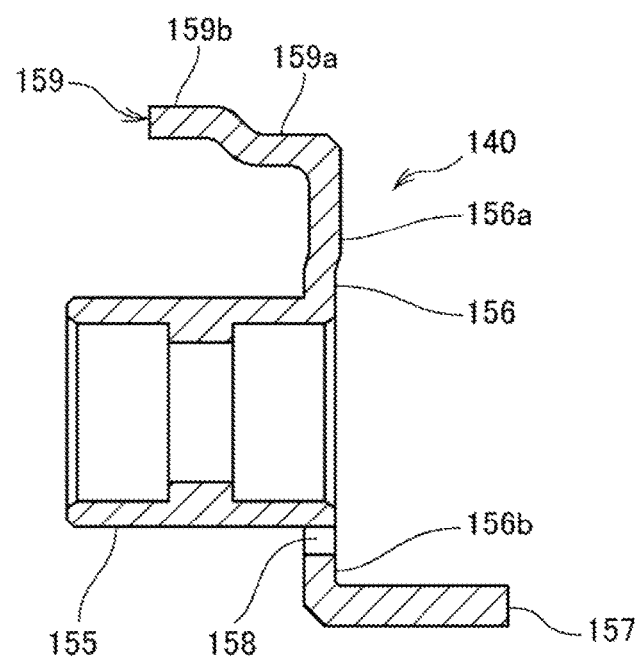

FIG. 11 is a sectional view taken along line XI-XI of FIG. 10, showing a peripheral part of the force accumulation mechanism 81. FIGS. 12A-12B illustrate the gear shift arm 140, wherein FIG. 12A is a front view, and FIG. 12B is a sectional view taken along line XII-XII of FIG. 12A. Here, in FIG. 11, the actuator mechanism 64, the force accumulation mechanism 81 and the change mechanism 89 are each in a neutral state (neutral position) in which neither shifting-up nor shifting-down is being conducted. In other words, in FIG. 11, the shift spindle 76, the gear shift arm 140, the master arm 80 and the like are in their neutral state. In addition, the clutch cover 30 is not depicted in FIG. 11.

As shown in FIGS. 10 to 12B, the gear shift arm 140 includes a cylindrical portion 155 and a plate portion 156. The cylindrical portion 155 is fitted to an outer circumferential surface of the shift spindle 76 through a bearing 154. The plate portion 156 extends radially outward from an outer circumferential portion of an end, on the force accumulation spring 145 side, of the cylindrical portion 155.

The plate portion 156 includes: an upward extension portion 156a extending upward from the cylindrical portion 155; and an extension portion 156b extending from the cylindrical portion 155 in a direction substantially orthogonal to the upward extension portion 156a.

The extension portion 156b is provided with a first locking piece 157 extending substantially in parallel to the shift spindle 76 from a tip portion of the extension portion 156b toward the force accumulation spring 145 side. In addition, the plate portion 156 is provided, between the cylindrical portion 155 and the first locking piece 157, with a hole 158 in which part of the shift-down collar 142 is fitted. The hole 158 is an arc-shaped slot extending along the cylindrical portion 155.

The upward extension portion 156a is provided with a second locking piece 159 which extends radially outward from a tip portion of the upward extension portion 156a and then extends substantially in parallel to the shift spindle 76 toward the return spring 141 side.

The second locking piece 159 includes: a base end side contact portion 159a passed through a restriction opening 160 of the master arm 80; and a tip-side return spring locking portion 159b to which the return spring 141 is fixed. The return spring locking portion 159b is formed to be slenderer than the contact portion 159a.

The master arm 80 includes a cylindrical portion 161 and an arm portion 162. The cylindrical portion 161 is slidably fitted to an outer circumferential surface of the cylindrical portion 155 of the gear shift arm 140. The arm portion 162 extends radially outward from an end, on the force accumulation spring 145 side, of the cylindrical portion 161. The master arm 80 is rotatable relative to the gear shift arm 140. The master arm 80 is disposed so that the arm portion 162 is proximate to the plate portion 156 of the gear shift arm 140.

The arm portion 162 is formed in a roughly L shape in front view shown in FIG. 11. The arm portion 162 includes: a position restriction arm 162a extending upward from the cylindrical portion 161; and an operation arm 162b extending from the cylindrical portion 161 in a direction substantially orthogonal to the position restriction arm 162a. The master arm 80 is connected to the shift drum 70 through the operation arm 162b. Rotation of the master arm 80 rotates the shift drum 70.

The master arm 80 is provided, at a tip portion of the position restriction arm 162a, with the restriction opening 160 through which the stopper pin 146 is passed. The second locking piece 159 of the gear shift arm 140 is passed through the restriction opening 160, at a position downwardly of the stopper pin 146. The restriction opening 160 has a predetermined width such that the stopper pin 146 and the second locking piece 159 can be moved relative to and within the restriction opening 160.

The master arm 80 is provided, at an upper edge portion of the restriction opening 160, with a spring locking piece 163 extending substantially in parallel to the shift spindle 76 toward the return spring 141 side.

The shift-down collar 142 is formed in a cylindrical shape, is axially positioned by abutment on the flange portion 76d, and is fixed to the shift-down collar fixing portion 152. The shift-down collar 142 has a dog tooth 164 inserted in the hole 158 in the gear shift arm 140. The whole length of the dog tooth 164 is set shorter than the whole length of the hole 158 so that the dog tooth 164 can move within the hole 158.

The force accumulation collar 143 includes: a cylindrical portion 166 fixed to the force accumulation collar fixing portion 153; an extension portion 167 extending radially outward from the cylindrical portion 166; and a force accumulation arm 168 extending substantially in parallel to the shift spindle 76 from the tip of the extension portion 167 toward the gear shift arm 140 side. As viewed in the axial direction of the shift spindle 76, the force accumulation arm 168 is disposed at substantially the same position, radially and circumferentially, as the first locking piece 157 of the gear shift arm 140. Specifically, the force accumulation arm 168 is provided at a position slightly deviated from the first locking piece 157 in the circumferential direction.

The spring collar 144 is disposed between the flange portion 76d and the force accumulation collar 143. The spring collar 144 rotates relative to the shift spindle 76 when the inner circumferential portion of the force accumulation spring 145 makes contact with the spring collar 144, thereby reducing the friction on the force accumulation spring 145.

The force accumulation spring 145 is a torsion coil spring. A gear shift arm side end portion 145a at one end of the force accumulation spring 145 is locked onto the first locking piece 157 of the gear shift arm 140. A force accumulation arm side end portion 145b at the other end of the force accumulation spring 145 is locked onto the force accumulation arm 168 of the force accumulation collar 143.

The return spring 141 is a torsion coil spring, a coil portion 141c of which is fitted to an outer circumferential portion of the cylindrical portion 161 of the master arm 80.

The return spring 141 has its one end 141a and other end 141b extending radially outward. The one end 141a and the other end 141b are provided to be substantially parallel to each other, with a predetermined spacing therebetween.

The return spring 141 is disposed in a state in which the stopper pin 146 is interposed between its one end 141a and its other end 141b.

In addition, the spring locking piece 163 of the master arm 80 is clamped between the one end 141a and the other end 141b, on the more tip side of the one end 141a and the other end 141b than the stopper pin 146. The second locking piece 159 of the gear shift arm 140 is retained between the one end 141a and the other end 141b, on the more base end side of the one end 141a and the other end 141b than the stopper pin 146.

The stopper pin 146 is fixed by fastening to the inner wall 36b of the other-side case half 26R. The stopper pin 146 extends substantially in parallel to the shift spindle 76, and is passed through the restriction opening 160 of the master arm 80. The stopper pin 146 is provided with a damper portion 170 at a tip portion thereof. The damper portion 170 includes: a cylindrical collar 170a fitted to the stopper pin 146; an elastic member 170b such as rubber interposed between the collar 170a and the stopper pin 146; and a washer-shaped fixture 170c fitted to the tip of the stopper pin 146 so as to prevent the collar 170a from slipping off. An inner circumferential portion of the restriction opening 160 of the master arm 80 comes into contact with the damper portion 170 when the master arm 80 is rotated. Therefore, an impact sound generated when the restriction opening 160 is received by the stopper pin 146 can be reduced by the damper portion 170.

Figure 13:
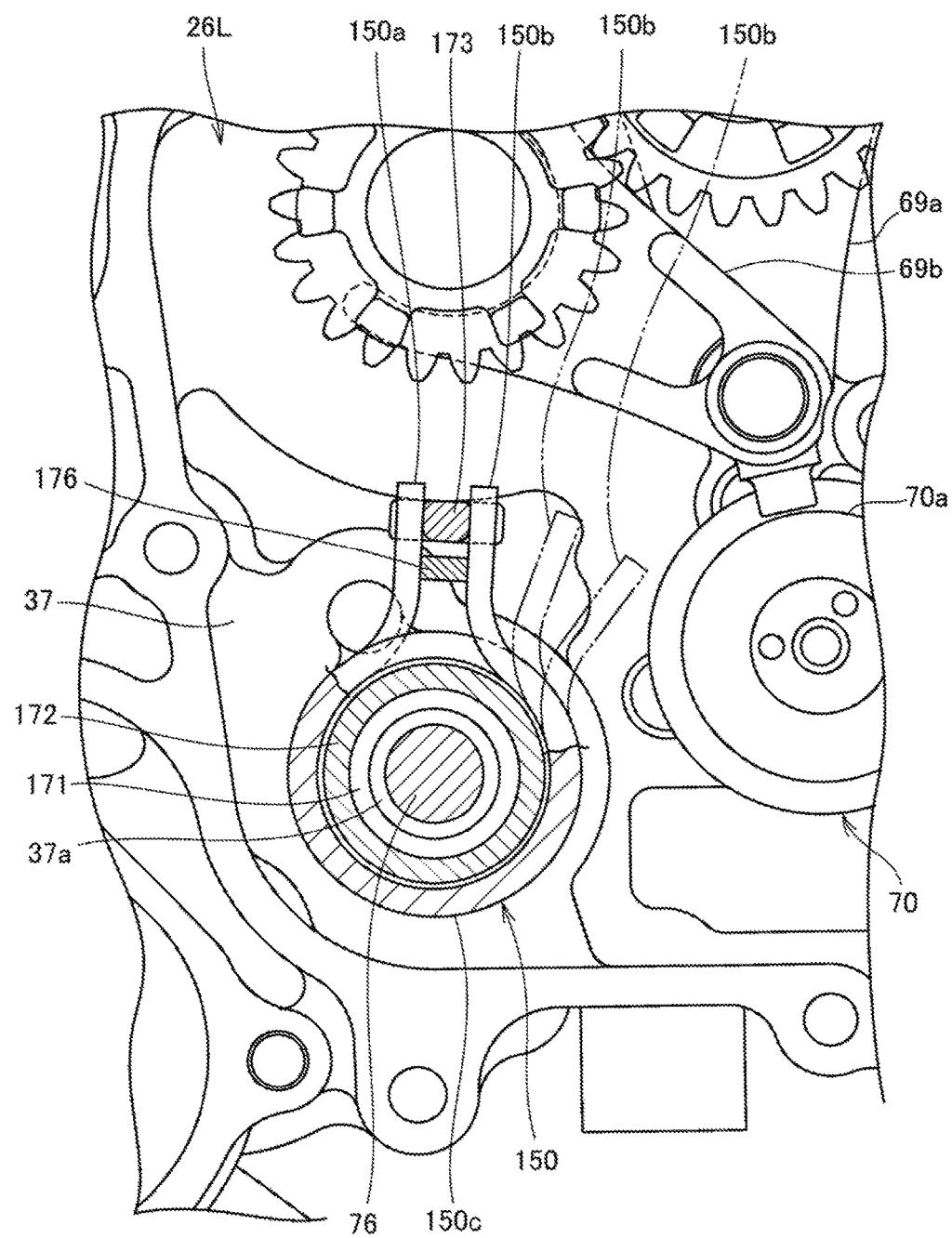
FIG. 13 is a sectional view taken along line XIII-XIII of FIG. 10.
Figure 14:
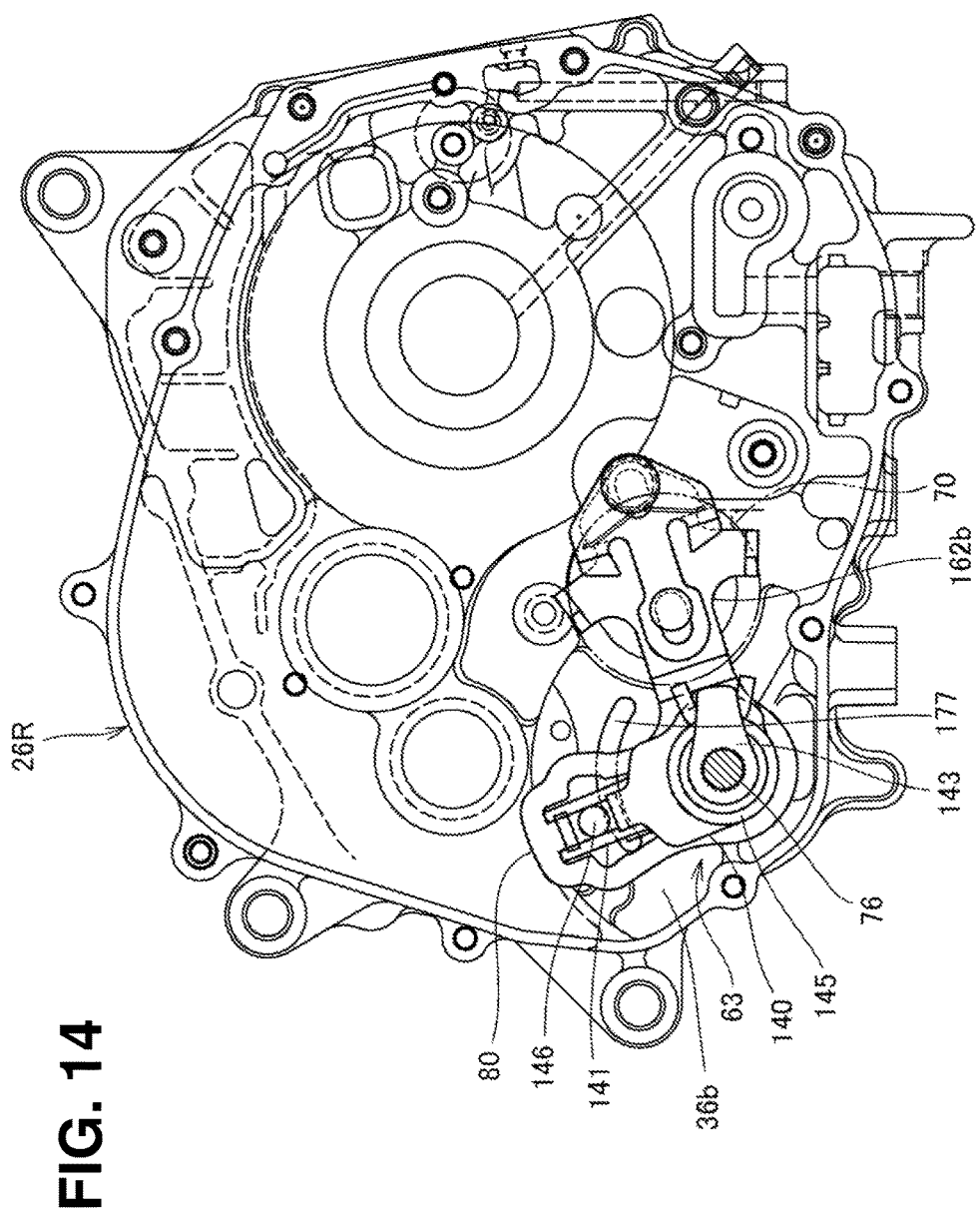
FIG. 14 is a sectional view taken along line XI-XI of FIG. 10.

FIG. 13 is a sectional view taken alone line XIII-XIII of FIG. 10. FIG. 14 is a sectional view taken along line XI-XI of FIG. 10. Here, FIG. 13 illustrates a neutral state. The clutch cover 30 is not shown in FIG. 14.

As shown in FIG. 10, the wall portion 37 of the one-side case half 26L is located on the outer side of the inner wall 36b of the other-side case half 26R. In a space 169 inside the transmission chamber 32 between the wall portion 37 and the inner wall 36b, there is provided a cylindrical sub return spring support portion 171 which projects along the shift spindle 76 from the wall portion 37 toward the inner wall 36b side. The bearing 37b supporting the shift spindle 76 is supported on an inner circumferential portion of the sub return spring support portion 171.

At the tip of the sub return spring support portion 171, there is provided a stepped portion which is hollowed in the circumferential direction. A cylindrical guide collar 172 is fixed to the stepped portion. An outer circumferential portion of the guide collar 172 and an outer circumferential portion of a base end portion of the sub return spring support portion 171 are flush with each other.

The wall portion 37 is provided, in the vicinity of the sub return spring support portion 171, with a boss 173 extending substantially in parallel to the shift spindle 76. The boss 173 and the sub return spring support portion 171 are formed to be integral with the wall portion 37, and their tip portions extend into the vicinity of the inner wall 36b.

The sub return spring 150 is a torsion coil spring. The sub return spring 150 includes a coil portion 150c, and one end 150a and the other end 150b projecting radially outward from both ends of the coil portion 150c, respectively.

The sub return spring 150 is supported by fitting of an inner circumferential portion of the coil portion 150c to an outer circumferential portion of the sub return spring support portion 171, and is disposed in the space 169.

The sub return spring 150 is disposed in a state in which the boss 173 is clamped between its one end 150a and its other end 150b. The sub return spring 150 is circumferentially positioned by the boss 173.

As illustrated in FIGS. 10 and 13, the sub return spring locking collar 148 is disposed between the inner wall 36b of the other-side case half 26R and the master arm 80, and is located inside the clutch chamber 34. In addition, the sub return spring locking collar 148 is located between the inner wall 36b and the return spring 141.

The sub return spring locking collar 148 includes a cylindrical portion 175 and an arm portion 176. The cylindrical portion 175 is fixed to the locking collar fixing portion 151 of the shift spindle 76. The arm portion 176 extends radially outward from the cylindrical portion 175, then bends to a side opposite to the return spring 141, and extends toward the sub return spring 150 side.

The inner wall 36b is provided with a hole 177 through which the arm portion 176 of the sub return spring locking collar 148 is passed. The hole 177 is formed in an arcuate shape corresponding to a rotary trajectory of the arm portion 176. The arm portion 176 is passed through the hole 177 to extend into the space 169, and is clamped between the one end 150a and the other end 150b of the sub return spring 150 at a position between the boss 173 and the coil portion 150c.

In the neutral state shown in FIG. 11, the change clutch 61 is in an engaged state, and a driving force is generated in the transmission 60. Therefore, the master arm 80 is arrested by the transmission 60 and is non-rotatable on the shift spindle 76.

In the neutral condition, the master arm 80 has its spring locking piece 163 clamped between the one end 141a and the other end 141b of the return spring 141, whereby the rotary position of the master arm 80 is restricted to a neutral position. The return spring 141 restricts the rotary position of the master arm 80 in a state in which a predetermined initial load is exerted thereon.

In the neutral state, the gear shift arm 140 has its return spring locking portion 159b clamped between the one end 141a and the other end 141b of the return spring 141, whereby the rotary position of the gear shift arm 140 is restricted to a neutral position. The return spring 141 restricts the rotary position of the gear shift arm 140 in a state in which the predetermined initial load is exerted thereon.

In other words, in the neutral condition, the master arm 80 and the gear shift arm 140 are so located as to be along a straight line L passing through the center of the shift spindle 76 and the center of the stopper pin 146.

In the neutral condition, the force accumulation spring 145 is provided in a state in which an initial bend corresponding to a predetermined torsion amount is imparted thereto between the force accumulation arm 168 and the first locking piece 157. In this state, a predetermined initial load is generated in the force accumulation spring 145.

As shown in FIG. 13, in the neutral condition, the sub return spring locking collar 148 has its arm portion 176 clamped between the one end 150a and the other end 150b of the sub return spring 150, whereby rotary position of the sub return spring locking collar 148 is restricted to a neutral position. The sub return spring 150 restricts the rotary position of the sub return spring fixing collar 148 in a state in which a predetermined initial load is exerted thereon.

Figure 15A:
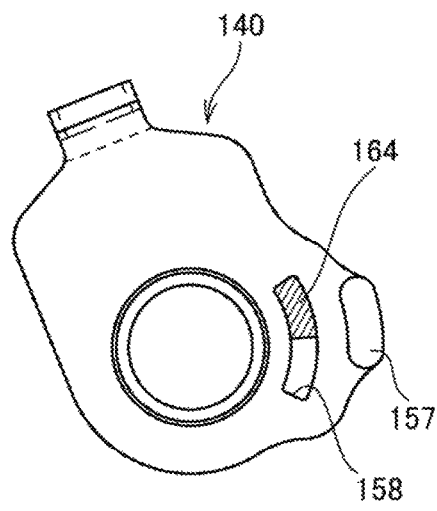
Figure 15B:
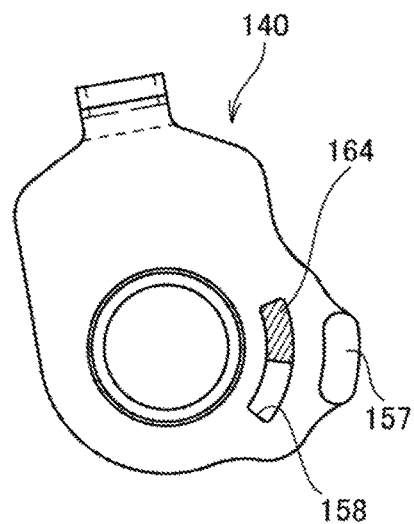
Figure 15C:
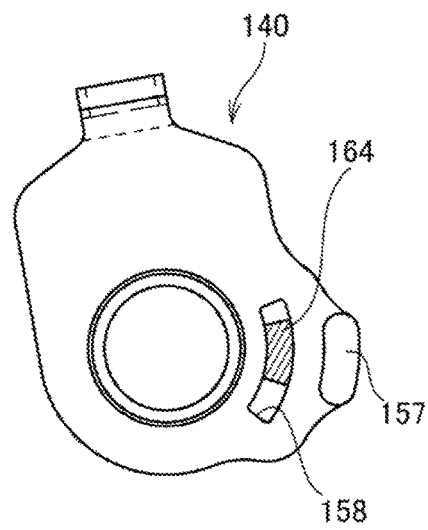
Figure 15D:
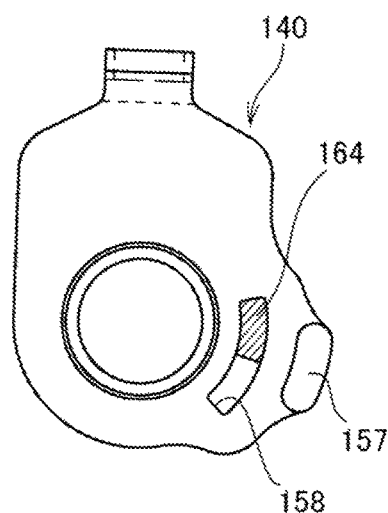

FIGS. 15A-15D illustrate positional states of the dog tooth 164 of the shift-down collar 142, wherein FIG. 15A shows a neutral state, and FIGS. 15B-15D show respective states of sequentially increased rotary amounts of the shift spindle 76.

As shown in FIG. 15A, in the neutral state, the dog tooth 164 is in contact with one end of the hole 158 of the gear shift arm 140, with a gap formed between the dog tooth 164 and the other end of the hole 158.

Here, an operation of the force accumulation mechanism 81 at the time of shifting-up will be described.

When the shift motor 75 of the actuator mechanism 64 is driven in response to a shift command from the control unit 17, rotation of the shift spindle 76 is started. The shift-up direction is the clockwise direction indicated by symbol UP in the figure.

Figure 16:
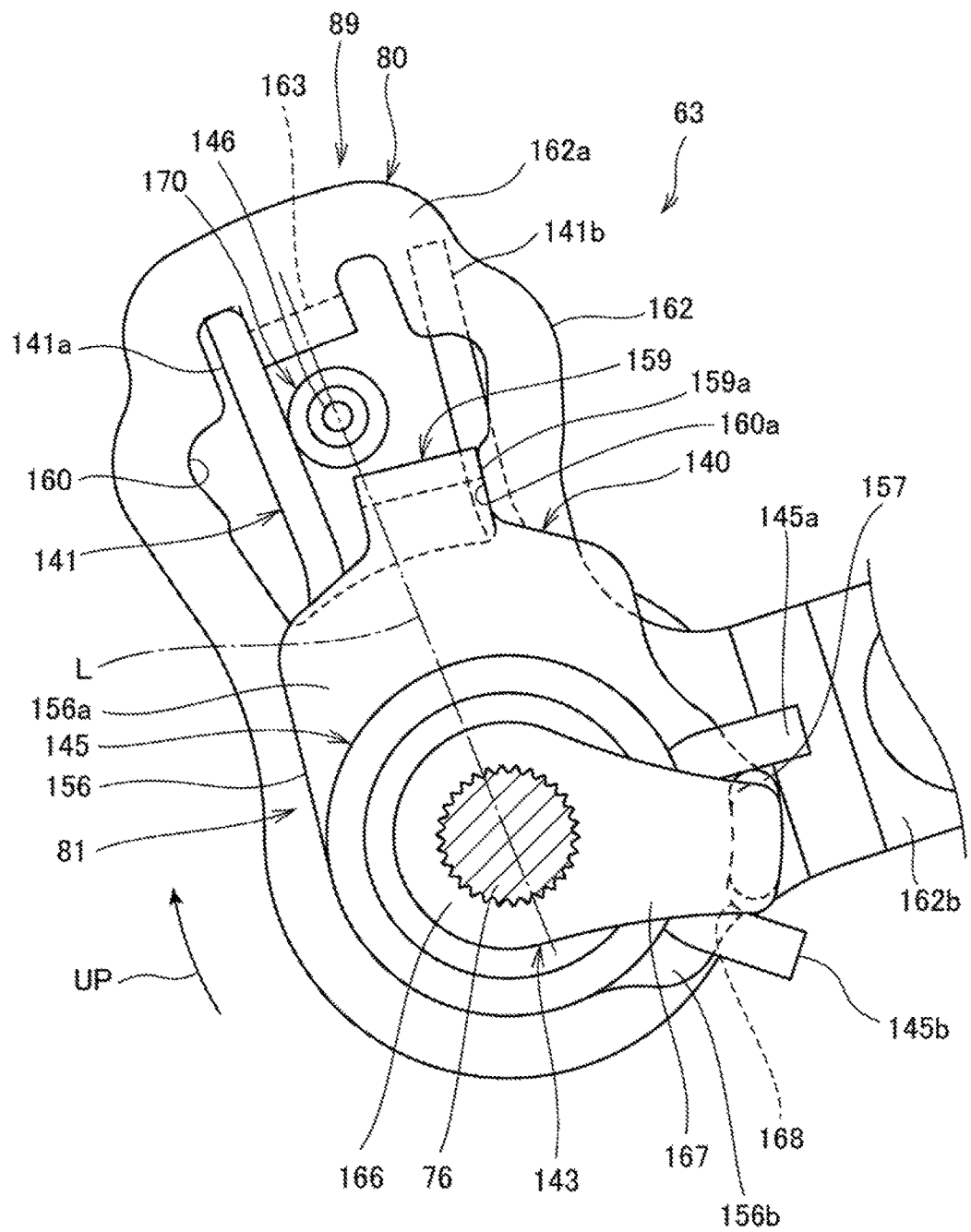
FIG. 16 illustrates a state advanced in a shift-up direction from the neutral state.

FIG. 16 illustrates a state advanced in a shift-up direction from the neutral state.

The state depicted in FIG. 16 is a state in which rotation of the shift spindle 76 has advanced to such an extent that the contact portion 159a of the second locking piece 159 of the gear shift arm 140 makes contact with an inner edge 160a of the restriction opening 160 in the master arm 80 so that the gear shift arm 140 cannot be rotated any more. In the following description, this state will be referred to as force accumulation preparatory state.

In the force accumulation preparatory state, the gear shift arm 140 has only rotated as one body with the force accumulation collar 143 through the force accumulation spring 145 attendantly on rotation of the force accumulation collar 143. Therefore, although the force accumulation mechanism 81 has rotated as a whole in a shift-up direction, bending amount of the force accumulation spring 145 has not been changed at all, and force accumulation has not been started yet. Besides, in the force accumulation preparatory state, the rotary amount of the master arm 80 from the neutral state is zero.

In the force accumulation preparatory state, the gear shift arm 140 has been rotated against a biasing force of the return spring 141, and the other end 141b of the return spring 141 is opened by a predetermined amount.

In addition, in the force accumulation preparatory state, the sub return spring locking collar 148 has been rotated against a biasing force of the sub return spring 150, and the other end 150b of the sub return spring 150 is opened by a predetermined amount, as indicated by alternate long and two short dashes line in FIG. 13.

In the force accumulation preparatory state, the shift-down collar 142 is rotated as one body with the gear shift arm 140. As shown in FIG. 15B, therefore, the dog tooth 164 is in contact with one end of the hole 158 in the gear shift arm 140, with a gap formed between the dog tooth 164 and the other end of the hole 158.

Figure 17:
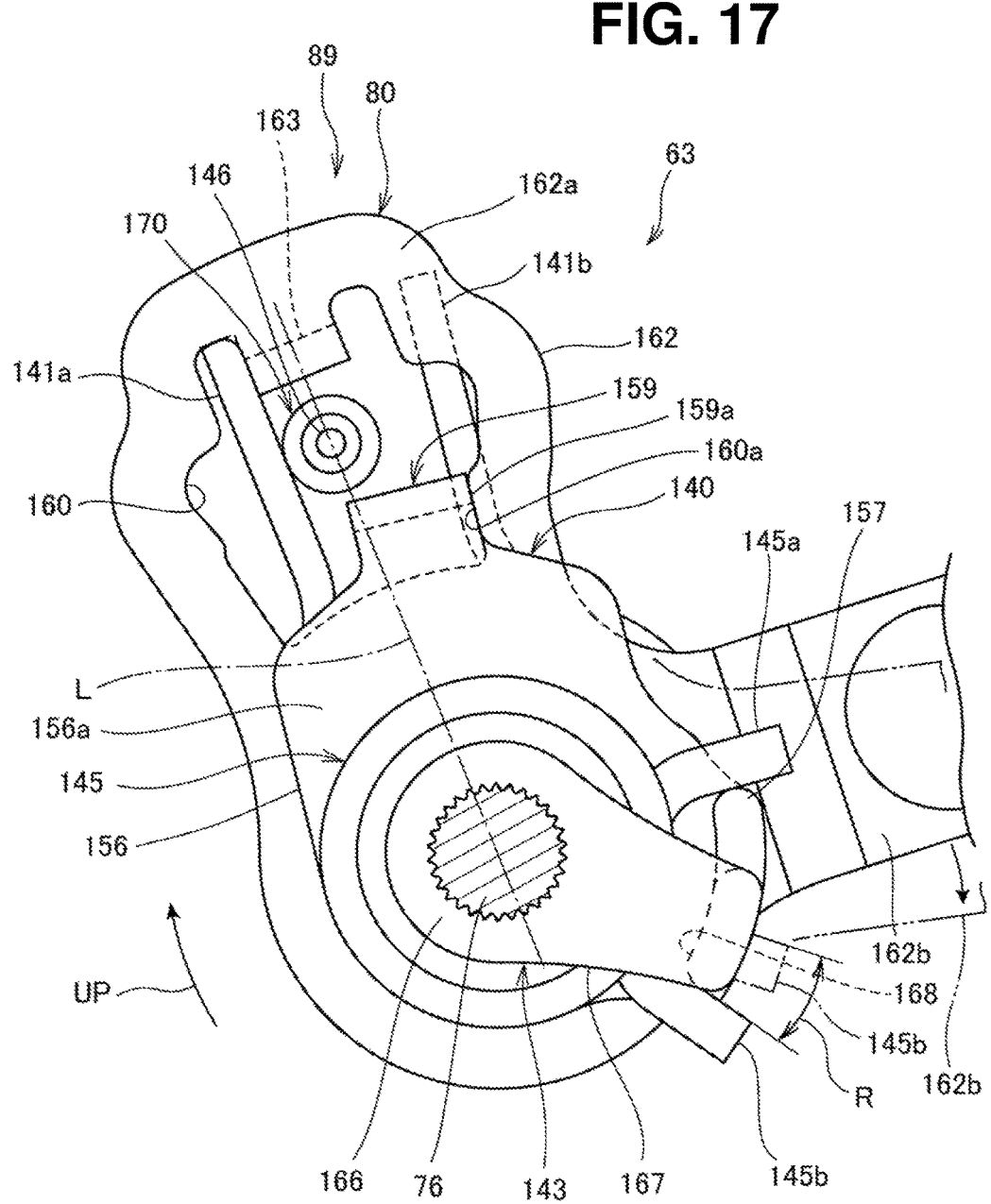
FIG. 17 illustrates a state advanced in the shift-up direction from a force accumulation preparatory state.

FIG. 17 illustrates a state advanced in the shift-up direction from the force accumulation preparatory state.

In the state depicted in FIG. 17, attendant on rotation of the shift spindle 76, only the force accumulation arm side end portion 145b of the force accumulation spring 145 has been rotated by a predetermined amount R by the force accumulation arm 168, with the gear shift arm side end portion 145a of the force accumulation spring 145 left positionally fixed by the first locking piece 157. In the following description, the state of FIG. 17 will be referred to as force accumulated state.

In the force accumulated state, the bending amount of the force accumulation spring 145 has been increased by an amount corresponding to the predetermined amount R, so that a predetermined amount of force accumulation in the force accumulation spring 145 has been completed. In addition, in the force accumulated state, the rotary amount of the master arm 80 from the neutral state is zero.

In the force accumulated state, in contrast to the gear shift arm 140 which would not be rotated because of restraint by the restriction opening 160, the shift-down collar 142 has been rotated together with the shift spindle 76. In the force accumulated state, therefore, as shown in FIG. 15C, the dog tooth 164 is located at an intermediate position between the one end and the other end of the hole 158 in the gear shift arm 140.

Besides, in the force accumulated state, the sub return spring locking collar 148 has been rotated against the biasing force of the sub return spring 150. In this state, the other end 150b of the sub return spring 150 is opened by a further predetermined amount from the state in the force accumulation preparatory state, as indicated by alternate long and two short dashes line in FIG. 13.

Referring to FIG. 3, the clutch lever 82 is rotated as one body with the shift spindle 76. Attendant on the rotation of the clutch lever 82, the lifter cam plate 85 is moved in the axial direction, whereby the change clutch 61 is disengaged. With the change clutch 61 disengaged, restraint on the master arm 80 by the transmission 60 is canceled, so that the master arm 80 becomes rotatable. The moment the change clutch 61 is disengaged, the force accumulated in the force accumulation mechanism 81 is released, so that the master arm 80 is rotated to a position indicated by alternate long and two short dashes line in FIG. 17 at a stroke by the accumulated force through the gear shift arm 140. Therefore, a shift can be performed speedily. The master arm 80 is rotated until that portion of the restriction opening 160 which is on the one end 141a side comes into contact with the damper portion 170 of the stopper pin 146.

When the accumulated force is released, the gear shift arm 140 is rotated in a shift-up direction relative to the shift-down collar 142 staying at rest, resulting in that one end of the hole 158 in the gear shift arm 140 makes contact with the dog tooth 164 as shown in FIG. 15D. Therefore, when rotating the shift spindle 76 in the shift-down direction opposite to the shift-up direction, the gear shift arm 140 can be rapidly rotated in the shift-down direction through the dog tooth 164. Consequently, returning into the neutral state can be achieved speedily.

At the time of shifting-down, first, the gear shift arm 140 is progressively rotated in the shift-down direction from the neutral state shown in FIG. 11, and a contact portion 159c of the gear shift arm 140 comes into contact with an inner edge 160b of the restriction opening 160 of the master arm 80. The section from the neutral state to the contact of the contact portion 159c with the inner edge 160b corresponds to section Y in FIG. 8. In the section Y, the change clutch 61 is disengaged attendantly on the rotation of the shift spindle 76, but the shift drum 70 is not yet rotated. When the shift spindle 76 is rotated in the shift-down direction beyond section Y, the master arm 80 is rotated in the shift-down direction through the contact portion 159c, and the shift drum 70 is rotated, to carry out a shift-down.

Figure 18:
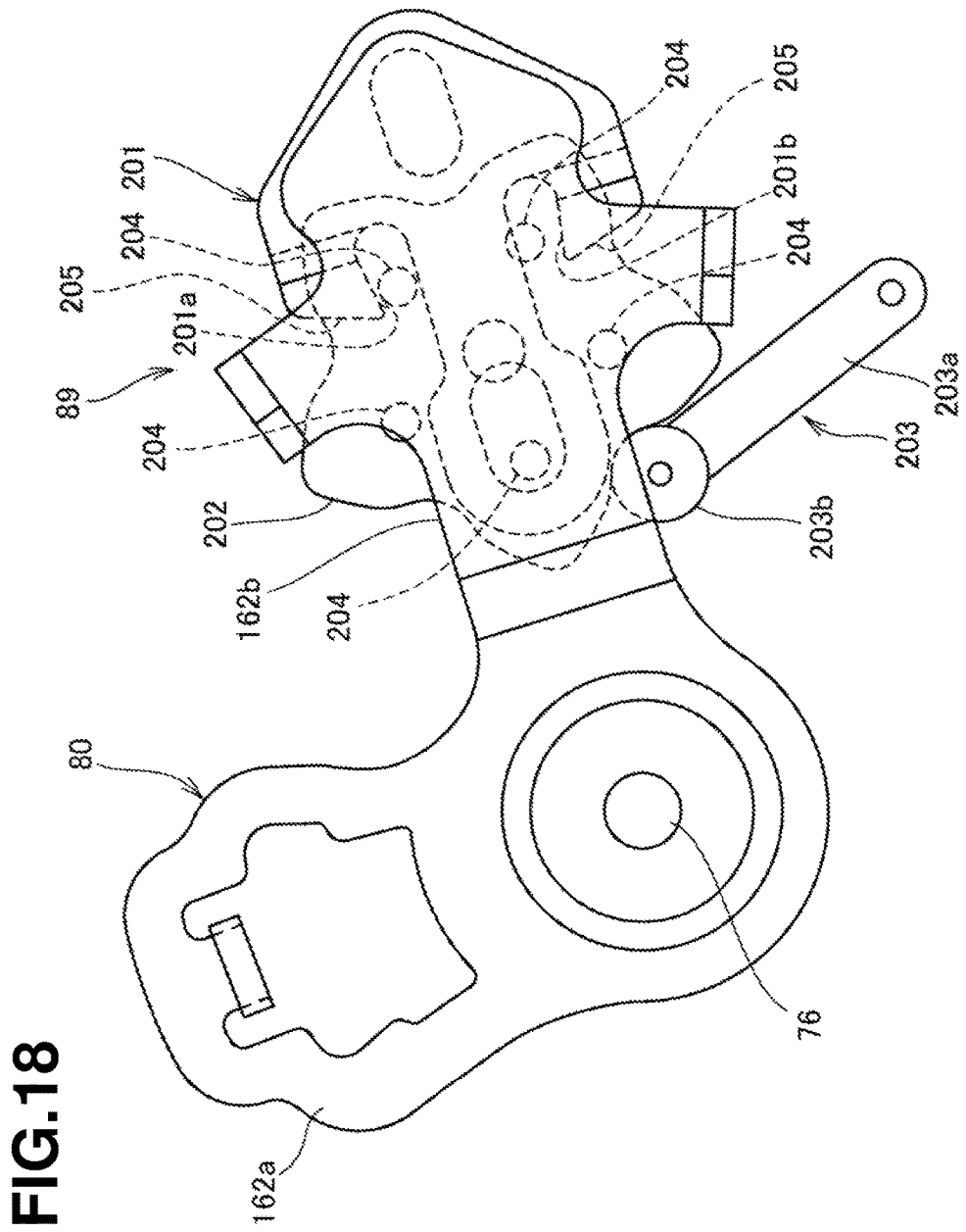
FIG. 18 is a side view of a change mechanism.
Figure 19A:
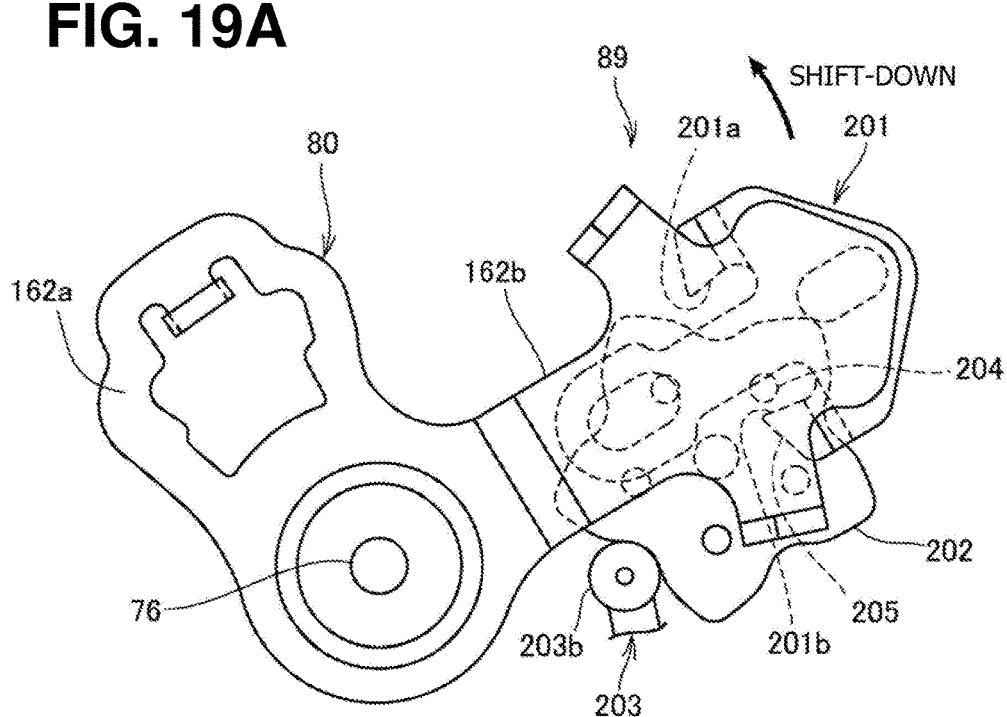
Figure 19B:
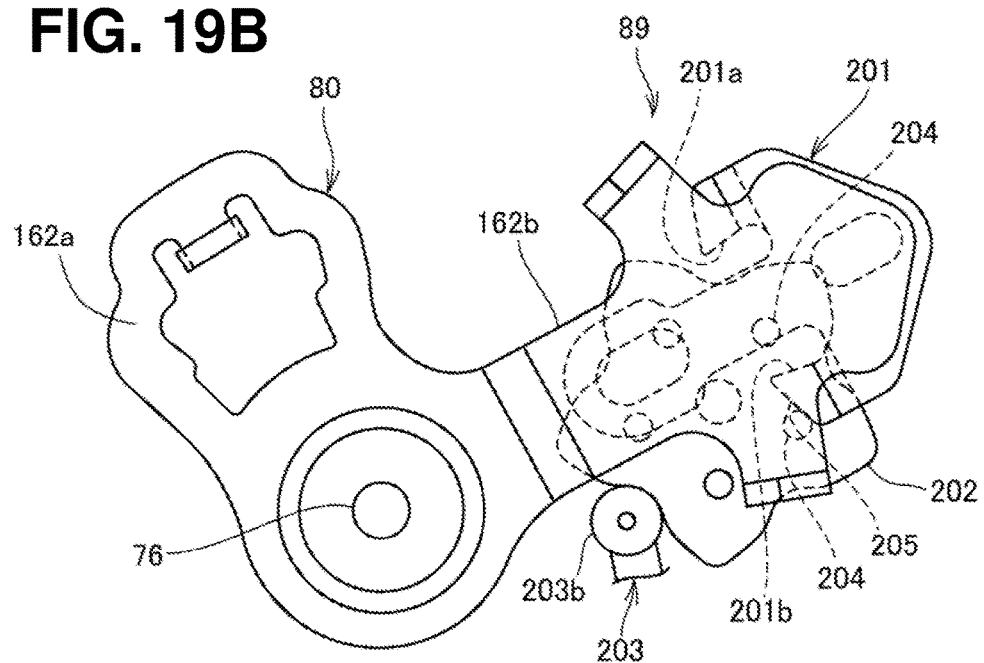

FIG. 18 is a side view of the change mechanism 89. FIGS. 19A-19B illustrate operating states of the change mechanism 89, wherein FIG. 19A shows a state upon completion of normal feeding in a shift-down direction, and FIG. 19B shows a state of returning toward a neutral position side from the state of FIG. 19A.

The change mechanism 89 includes: a feeding operation member 201 provided at a tip portion of the master arm 80; a star-shaped plate 202 provided at a shaft end of the shift drum 70 (FIG. 14); and a stopper arm 203 (biasing member) making contact with an outer circumferential portion of the star-shaped plate 202 to restrict rotary position of the star-shaped plate 202.

The star-shaped plate 202 includes a plurality (five) of cam ridges projecting radially at positions at substantially regular intervals along the circumferential direction, and a plurality (five) of locking pins 204 projecting in the axial direction from outside surfaces of the cam ridges, respectively. The star-shaped plate 202 is provided to be integral with the shift drum 70. The shift drum 70 is rotated by a process in which the locking pin 204 is pressed by the feeding operation member 201.

The stopper arm 203 includes an arm portion 203a rotatably supported on the crankcase 26, and a roller 203b rotatably supported on a tip portion of the arm portion 203a. The arm portion 203a is biased by a spring (not shown), which is connected to the an portion 203a, so that the roller 203b constantly stays in contact with an outer circumferential portion of the star-shaped plate 202. In other words, when the shift drum 70 rotates, the roller 203b moves along the cam ridges and cam valleys between the cam ridges of the star-shaped plate 202.

The feeding operation member 201 is slidable in a longitudinal direction of the operation arm 162b of the master arm 80, and is biased by a spring or the like (not shown) so as to move toward the shift spindle 76 side.

The feeding operation member 201 is provided on the tip side thereof with a shift-up pressing portion 201a and a shift-down pressing portion 201b which project in the axial direction of the shift drum 70 toward the locking pin 204 side.

FIG. 18 illustrates a neutral state of the change mechanism 89. In this state, the roller 203b is in engagement with a valley portion of the star-shaped plate 202, whereby the shift drum 70 is positioned at a rotary angle corresponding to a predetermined gear position. Besides, in the neutral state, the shift-up pressing portion 201a and the shift-down pressing portion 201b are located at respective positions slightly spaced to the outer sides from the two adjacent locking pins 204, 204.

When the master arm 80 is rotated in a shift-down direction in response to a shift-down command, the shift-down pressing portion 201b comes into contact with one locking pin 204 from below, and rotates the shift drum 70 in a shift-down direction through the locking pin 204. In this case, the shift-down pressing portion 201b rotates the shift drum 70 against a biasing force of the stopper arm 203. Specifically, the shift-down pressing portion 201b rotates the shift drum 70 against the biasing force of the stopper arm 203, until the roller 203b comes beyond the cam ridge of the star-shaped plate 202. After the roller 203b has come beyond the cam ridge of the star-shaped plate 202, a pressing force at the time of the roller 203b coming down toward the valley portion side causes the shift drum 70 to automatically rotate until the roller 203b comes into engagement with the valley portion. In other words, if the shift drum 70 is rotated to such a position that the roller 203b comes beyond the cam ridge of the star-shaped plate 202, the shift drum 70 automatically rotates to a position corresponding to the next shift position even after the shift-down pressing portion 201b is separated from the locking pin 204. Therefore, in a state in which the master arm 80 has been completely fed in the shift-down direction, as shown in FIG. 19A, the shift-down pressing portion 201b is separate from the locking pin 204. In other words, if the shift drum 70 is rotated to such a position that the roller 203b comes beyond the cam ridge of the star-shaped plate 202, the master arm 80 is rotatable also in the opposite direction, independently from the shift drum 70.

At the time of returning from the state of FIG. 19A to the neutral state of FIG. 18, the master arm 80 is rotated in a shift-up direction. In this case, the feeding operation member 201 is moved in the longitudinal direction of the operation arm 162b by a process in which its returning contact portion 205 provided in the vicinity of its shift-down pressing portion 201b rotates while making contact with the other locking pin 204, as shown in FIG. 19B. Upon complete returning to the neutral position, the state of FIG. 18 is established.

While the case of shifting-down has been described here, a shifting-up process includes pressing of the locking pin 204 by the shift-up pressing portion 201a, which causes the shift drum 70 to be rotated in a shift-up direction.

The control unit 17 performs a touch point learning control. In the touch point leaning control, a touch point at which the change clutch 61 is put into a partial clutch engagement state is learned, on the basis of a driving duty of the shift motor 75 at the time when the shift spindle 76 is rotated toward the shift-up side and toward the shift-down side by the shift motor 75.

Specifically, the touch point refers to a rotary angle θd1 (FIG. 8) of the shift spindle 76 at the time when the sub lifter plate 97 (FIG. 5) is separated from the stopper plate 102 in the case where the shift spindle 76 is progressively rotated to the shift-down side.

Here, referring to FIG. 8, variation in the capacity of the change clutch 61 in the case where the shift spindle 76 is progressively rotated to the shift-down side from a neutral position (0°) will be described. An operation of varying the capacity of the change clutch 61 on the shift-down side is basically the same as that on the shift-up side. However, as shown in FIG. 7, a setting is made such that the characteristic of the lift of the lifter cam plate 85 in relation to the rotation of the shift spindle 76 on the shift-down side rises at a small rotary angle (rotary amount) with reference to the neutral position and increases at a steep gradient, as compared with that on the shift-up side. For this reason, on the shift-down side, the disengagement of the change clutch 61 starts at a small rotary amount of the shift spindle 76 and the disengagement of the change clutch 61 to the disengagement capacity C4 is completed at a small rotary amount of the shift spindle 76, with reference to the neutral position, as compared to the case on the shift-up side.

Specifically, the operation occurring in the change clutch 61 at a rotary angle θd1 is the same as the operation at the rotary angle θ1 on the shift-up side, and the rotary angle θd1 is smaller than the rotary angle θ1, with reference to the neutral position. In other words, when the rotary angle of the shift spindle 76 becomes the rotary angle θd1, the clutch capacity becomes the first intermediate capacity C2.

In addition, the operation occurring in the change clutch 61 at a rotary angle θd2 is the same as the operation at the rotary angle θ2 on the shift-up side, and the operation occurring in the change clutch 61 at a rotary angle θd3 is the same as the operation at the rotary angle θ3 on the shift-up side.

Besides, as shown in FIG. 8, rotation of the shift drum 70 is started when the shift spindle 76 is rotated further by a predetermined amount F in the shift-down direction after the change clutch 61 is completely disengaged.

Figure 20:
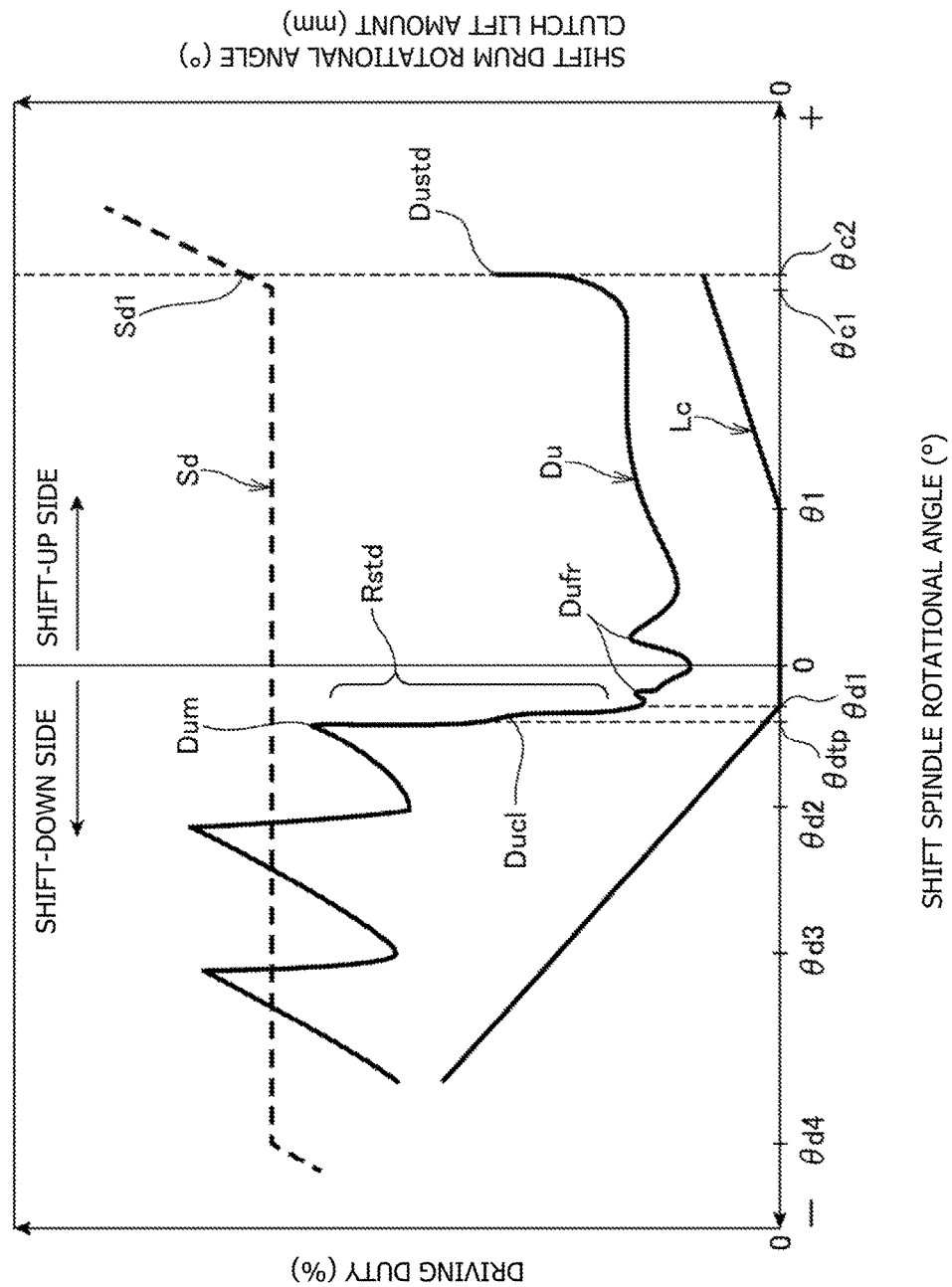
FIG. 20 is a diagram showing relationships between rotary angle of the shift spindle, driving duty of a shift motor, rotary angle of the shift drum, and lift amount of the lifter cam plate during a touch point learning control.

FIG. 20 is a diagram showing relationships between the rotary angle of the shift spindle 76, the driving duty Du of the shift motor 75, the rotary angle Sd of the shift drum 70 and the lift amount Lc of the lifter cam plate 85 during the touch point learning control.

The control unit 17 performs a feed-back control of the rotary angle of the shift spindle 76 so that the actual rotary angle of the shift spindle 76 will follow up to a target rotary angle. The feed-back control is a control wherein a voltage impressed on the motor is controlled so as to reduce the difference between the target rotary angle and the actual rotary angle. The control of the voltage impressed on the motor is conducted by regulating the driving duty in a PWM (pulse width modulation) control.

During the touch point learning control shown in FIG. 20, the control unit 17 varies the target rotary angle for the shift spindle 76 at a constant rate. A rotating operation of the shift spindle 76 is in ramp response wherein the rotary angle varies at a constant rate (for example, 10°/second).

During the ramp response, if the output of the shift motor 75 is sufficient to such an extent as to follow up to a set speed in the ramp response, the shift motor 75 outputs, every moment, a driving duty Du necessary for the ramp response.

On the other hand, in order to rotate the shift spindle 76, there is needed a torque for resisting against various frictions (friction attendant on rotation of bearings in the periphery of the shift spindle 76, cogging torque or friction in the shift motor 75, etc.) and for operating the gear change mechanism 63 and the clutch operation mechanism 62. The torque thus required varies every moment according to variation in the rotary angle of the shift spindle 76. Therefore, in a range in which the ramp response is performed properly, the required torque at a certain rotary angle of the shift spindle 76 has correlation with the driving duty Du of the shift motor 75. Accordingly, a point of variation in the torque of the shift spindle 76 can be detected from the driving duty Du.

As shown in FIG. 20, when the shift spindle 76 is progressively rotated from the neutral position (0°) to the shift-up side, compression of the sub spring 98 is started at a rotary angle θ1. At and after the rotary angle θ1, therefore, the required torque of the shift spindle 76 increases, and the driving duty Du also increases. In addition, the rotary angle of the shift drum 70 does not vary in the section from the neutral position to the rotary angle θ1.

When the rotary angle of the shift spindle 76 increases from the rotary angle θ1 and reaches the rotary angle θc1, the shift drum 70 starts rotating in a shift-up direction. When the rotary angle of the shift spindle 76 increases to a rotary angle θc2, the rotary angle Sd of the shift drum 70 reaches a drum angle threshold Sd1 having a predetermined magnitude.

In addition, a torque for rotating the shift drum 70 through the gear change mechanism 63 comes to be needed. For this reason, the driving duty Du starts increasing rapidly from the rotary angle θc1 or from a point slightly before the rotary angle θc1, and then reaches a standard duty Dustd having a predetermined magnitude at the rotary angle θc2. In other words, the standard duty Dustd is a driving duty Du at the time when the rotary angle Sd of the shift drum 70 reaches the drum angle threshold Sd1.

When the shift spindle 76 is progressively rotated from the neutral position (0°) to the shift-down side, compression of the sub spring 98 starts at a rotary angle θd1. At and after the rotary angle θd1, therefore, the required torque of the shift spindle 76 increases, and the driving duty Du also increases. Here, on the shift-down side, the lift amount Lc of the lifter cam plate 85 per unit rotary amount of the shift spindle 76 is large. Therefore, the rise (increase) in the driving duty Duc1 at the time when the disengagement of the clutch is started at the rotary angle θd1 is greater than the rise in the driving duty Du at the rotary angle θ1. The driving duty Ducl instantaneously increases to a maximum driving duty Dum greater than the standard duty Dustd in the vicinity of the rotary angle θd1, and thereafter lowers temporarily.

Figure 21:
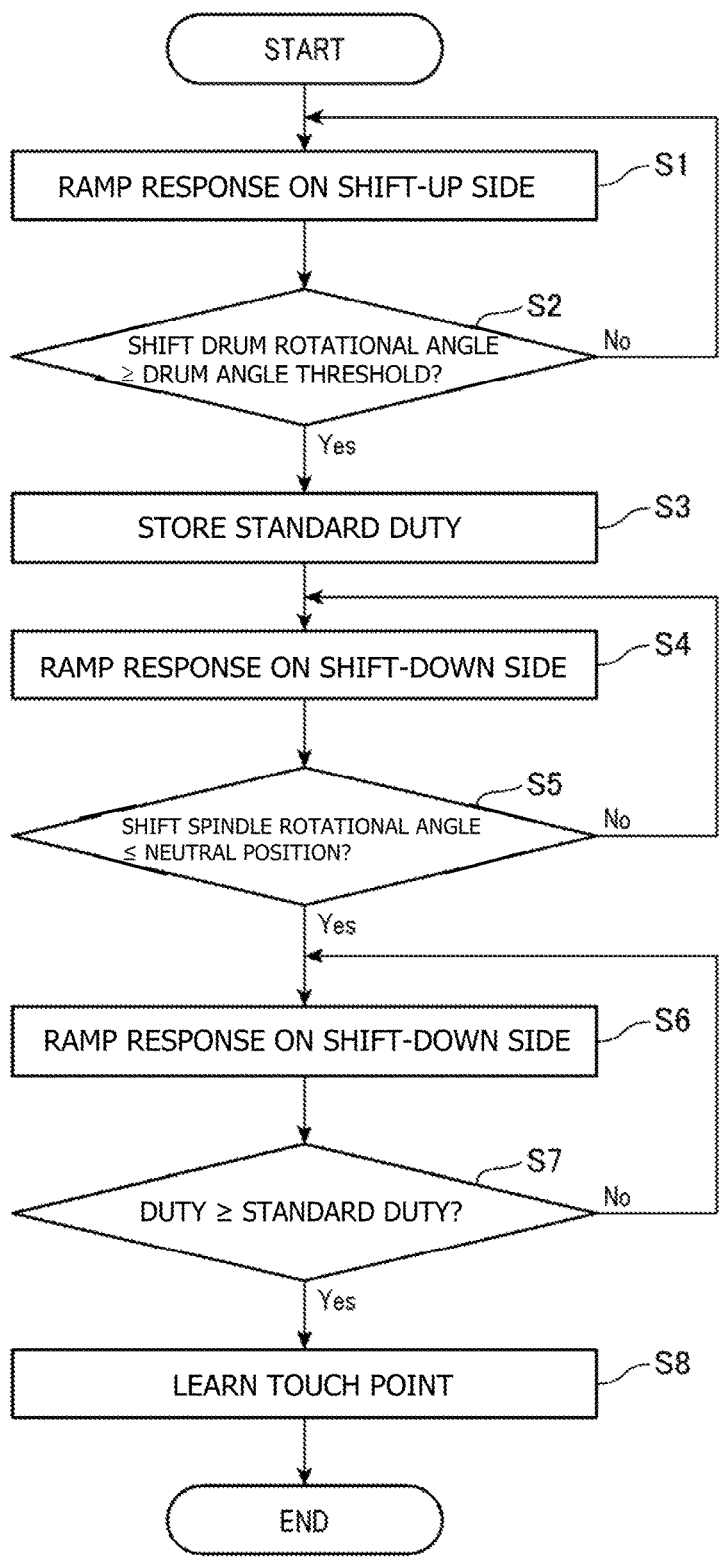
FIG. 21 is a flow chart of the process of the touch point learning control.

FIG. 21 is a flow chart showing the process of the touch point learning control.

The control unit 17 performs the touch point learning control once each time a main power source of the motorcycle 10 is turned on by a main key or the like. The control unit 17 carries out the touch point learning control when the motorcycle 10 is not running but at a stop and the transmission 60 is in a neutral state. When the main power source is turned on, the control unit 17 becomes able to drive the shift motor 75.

First, the control unit 17 rotates the shift spindle 76 progressively from the neutral position to the shift-up side in ramp response (step S1), and determines whether or not the rotary angle of the shift drum 70 has reached the drum angle threshold Sd1 (step S2). If the drum angle threshold Sd1 has not yet been reached (step S2: No), the control unit 17 returns to step S1.

If the rotary angle of the shift drum 70 has reached the drum angle threshold Sd1 (step S2: Yes), the control unit 17 stores a driving duty Du at the time when the rotary angle of the shift drum 70 has reached the drum angle threshold Sd1, as a standard duty Dustd (step S3).

Subsequently, the control unit 17 rotates the shift spindle 76 progressively to the neutral position side in ramp response (step S4), and determines whether or not the shift spindle 76 has reached a neutral position (step S5). If the shift spindle 76 has not yet reached the neutral position, the control unit 17 returns to step S4, and continues rotation of the shift spindle 76.

If the shift spindle 76 has reached the neutral position (step S5: Yes), the control unit 17 rotates the shift spindle 76 progressively from the neutral position to the shift-down side in ramp response (step S6), and determines whether or not the driving duty Du of the shift motor 75 has reached a value equal to the standard duty Dustd (step S7). If the driving duty Du has not yet reached the value equal to the standard duty Dustd (step S7: No), the control unit 17 returns to step S6, and continues rotation of the shift spindle 76.

If the driving duty Du has reached the value equal to the standard duty Dustd (step S7: Yes), the control unit 17 learns (stores) a rotary angle θdtp of the shift spindle 76 at the time when the driving duty Du has reached the value equal to the standard duty Dustd, as a touch point in a nonvolatile memory (step S8), and finishes the process of FIG. 21.

The standard duty Dustd stored by the control unit 17 in step S3 is the driving duty Du of a magnitude required for rotating the shift drum 70 through the gear change mechanism 63. Therefore, this driving duty is greater than a first-period (beginning-period) driving duty Dufr for resisting the friction in the vicinity of the neutral position at the time of rotating the shift spindle 76 in the shift-up direction or shift-down direction from the neutral position in ramp response.

In the present embodiment, a configuration is adopted wherein the clutch operation mechanism 62 is rotated prior to the gear change mechanism 63 at the time of making a shift-down. When the shift spindle 76 is rotated in the shift-down direction in ramp response in step S6, therefore, the driving duty Ducl for disengaging the change clutch 61 is generated earlier, and this driving duty Ducl is greater than the first-period driving duty Dufr for resisting the friction in the beginning period of rotation.

For this reason, in the case of rotating the shift spindle 76 from the neutral position to the shift-down side, the rotary angle θdtp of the shift spindle 76 at the time when the driving duty Ducl reaches a value equal to the standard duty Dustd detected on the shift-up side is learned as the touch point, and, by this process, the touch point can be learned with high accuracy without being influenced by frictions or the like.

Here, the standard duty Dustd is set to be greater than the first-period driving duty Dufr and smaller than the maximum driving duty Dum. In other words, the standard duty Dustd is set within a standard duty setting region Rstd between the first-period driving duty Dufr and the maximum driving duty Dum.

In addition, the drum angle threshold Sd1 is so set that the driving duty Du becomes the standard duty Dustd at the rotary angle of the shift spindle 76 at the time when the rotary angle of the shift drum 70 reaches the drum angle threshold Sd1.

The driving duty Du of the shift motor 75 is influenced by variations in output of the shift motor 75, dimensional variations, variations in properties of a lubricating oil, etc. due to temperature. In addition, there are individual variabilities in regard of the shift motor 75. For these reasons, the value of the driving duty Du of the shift motor 75 varies depending on the ambient temperature and the temperature of the engine 21, even if the rotary angle of the shift drum 70 remains the same. In the present embodiment, the shift motor 75, the clutch operation mechanism 62, the gear change mechanism 63 and the like are mounted on the same power unit 16. Therefore, the influences of temperature on these components are substantially the same. Accordingly, the standard duty Dustd receives the same temperature influences as those on the driving duty Du corresponding to the touch point.

Consequently, by acquiring the standard duty Dustd each time the touch point learning control is performed, the touch point can be accurately learned while reducing the influences of temperature.

The control unit 17 performs a comparison control in which the touch point newly learned is compared with a previously learned touch point.

Figure 22:
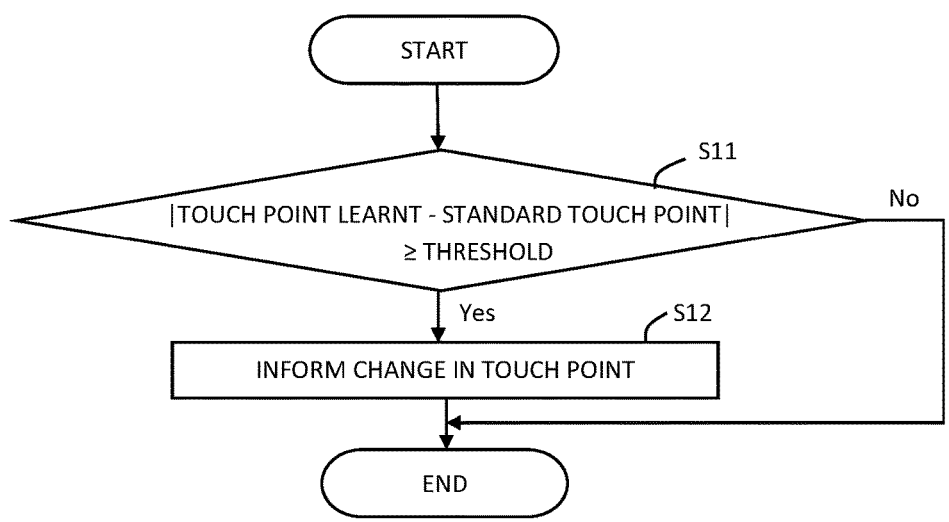
FIG. 22 is a flow chart of the process of a comparison control.

FIG. 22 is a flow chart of the process of the comparison control.

First, the control unit 17 calculates the absolute value of the difference between a rotary angle θdtp, which is the touch point learned, and a standard touch point serving as a standard (reference), and determines whether or not this absolute value is not less than a predetermined threshold (step S11). Here, the standard touch point is the touch point which has been learned (stored) in or before last run and serves as a standard (reference), and the standard touch point is a predetermined rotary angle of the shift spindle 76. Examples of the standard touch point include a touch point learned when the main power source of the motorcycle 10 has been turned on to operate the engine 21 last time, a touch point learned when the main power source of the motorcycle 10 has been turned on to supply power to the automatic transmission apparatus 25 last time, and a touch point set (learned) as an initial value at the time of manufacture of the motorcycle 10 in a factory.

If the absolute value is lower than the threshold (step S11: No), the control unit 17 finishes the process of FIG. 22.

If the absolute value is not less than the threshold value (step S11: Yes), the control unit 17 informs the user or worker or the like that the touch point has changed from the standard touch point, through an indicator (not shown) provided on the motorcycle 10 (step S12), and finishes the process.

Note that the process of the flow chart in FIG. 21 may be carried out when the transmission is not in the neutral state but in an in-gear state of being in a certain gear position (speed), upon turning-on of the main power source of the motorcycle 10.

As has been described above, according to the embodiment of the present invention, the automatic transmission apparatus 25 includes the main shaft 65 and the countershaft 66. The main shaft 65 is a shaft to which the rotary power of the engine 21 is routed through the change clutch 61 and which is provided with the plurality of driving gears including the driving gear 67b (which is a driving-side shifter gear). The countershaft 66 is provided with the plurality of driven gears driven by the plurality of driving gears, the driven gears including the driven gear 68c which is a driven-side shifter gear. The automatic transmission apparatus 25 also includes: the plurality of shift forks 69a and 69b adapted to move the driving gear 67b and the driven gear 68c in the axial direction; the shift drum 70 having lead grooves 70a for engagement with end portions of the shift forks 69a and 69b; the drum angle sensor 70b adapted to detect the rotary angle Sd of the shift drum 70; the shift spindle 76 provided with the clutch operation mechanism 62 adapted to operate the change clutch 61 and the gear change mechanism 63 adapted to operate the shift drum 70; the shift spindle angle sensor 79 adapted to detect the rotary angle of the shift spindle 76; the shift motor 75 adapted to rotate the shift spindle 76; and the control unit 17 adapted to control the shift motor 75. The change clutch 61 has the first intermediate capacity C2 (which is a partial clutch engagement state) between the maximum capacity C1 (which is a fully engaged state) and the disengagement capacity C4 (which is the clutch disengaged state). The clutch operation mechanism 62 is rotated (operated) prior to the gear change mechanism 63 when the shift spindle 76 is rotated to the shift-down side. The control unit 17 rotates the shift spindle 76 to the shift-up side, stores as a standard duty Dustd the driving duty of the shift motor 75 at the time when the rotary angle Sd of the shift drum 70 reaches the drum angle threshold Sd1, thereafter rotates the shift spindle 76 to the shift-down side, and learns the rotary angle θdtp of the shift spindle 76 at the time when the standard duty Dustd is generated, as the touch point at which the change clutch 61 is put into the first intermediate capacity C2.

This configuration ensures the following. When the control unit 17 rotates the shift spindle 76 to the shift-up side, the driving duty of the shift motor 75 generated at the time when the shift drum 70 reaches the drum angle threshold Sd1 can be stored as the standard duty Dustd. Thereafter, when the control unit 17 rotates the shift spindle 76 to the shift-down side, the clutch operation mechanism 62 is rotated prior to the gear change mechanism 63. Therefore, it is possible to detect that the driving duty Ducl corresponding to the torque for operating the clutch operation mechanism 62 has become the standard duty Dustd. The standard duty Dustd has a predetermined magnitude corresponding to the torque required for causing the shift drum 70 to reach the drum angle threshold Sd1. Therefore, by learning the rotary angle θdtp of the shift spindle 76 at the time when the standard duty Dustd is generated on the shift-down side as the touch point at which the change clutch 61 is put into the first intermediate capacity C2, the touch point on the shift-down side can be learned with high accuracy while excluding influences of, for example, frictions near the neutral position of the shift spindle 76.

In addition, since the control of the shift spindle 76 at the time of learning the touch point is carried out using ramp response, variation in the torque of the shift spindle 76 is reflected on the driving duty Du with high accuracy. Therefore, the touch point can be learned with high accuracy.

The characteristic of the clutch lift amount of the lifter cam plate 85 of the change clutch 61 in relation to the rotary angle of the shift spindle 76 is so set that the clutch lift amount on the shift-down side rises at a small rotary angle and increases at a steep gradient, as compared to the clutch lift amount on the shift-up side. Therefore, it is usually difficult to learn the touch point on the shift-down side with high accuracy. By utilizing the standard duty Dustd stored on the shift-up side, however, the touch point on the shift-down side can be learned highly accurately. Besides, since the characteristic of the clutch lift amount varies at a steep gradient on the shift-down side, the rise time of the driving duty Ducl corresponding to the clutch lift is short. However, the rise of the driving duty Du is rather clear. By comparison with the standard duty Dustd, therefore, the touch point can be learned with high accuracy. When the characteristic of the clutch lift amount rises at a small rotary angle, it becomes difficult to distinguish between the first-period driving duty Dufr and the driving duty Ducl corresponding to the clutch lift. By comparison with the standard duty Dustd, however, the driving duty Ducl corresponding to the clutch lift can be determined, and the touch point can be learned highly accurately.

Furthermore, the control of learning of the touch point is carried out when the engine 21 is started or once each time the main power source of the motorcycle 10 is supplied. Therefore, the touch point can be accurately learned when the engine 21 is started or each time the main power source of the motorcycle 10 is supplied.

In addition, the control unit 17 stores the touch point learned when the engine 21 has been operated last time or when the power source of the automatic transmission apparatus 25 has been turned on last time, in a nonvolatile memory, and compares the rotary angle θdtp, which is the touch point learned this time, with the touch point learned last time. Therefore, it can be determined whether or not the touch point has varied or the touch point has been regulated by the user or the like during when the engine 21 or the motorcycle 10 has been at a stop.

Note that the above embodiment is merely an exemplary embodiment of the present invention, and the present invention is not to be limited to the above embodiment.

While the gear change mechanism 63 has been described to have the force accumulation mechanism 81 in the above embodiment, the present invention is not restricted to this. For example, a configuration may be adopted wherein the force accumulation mechanism 81 is not provided and wherein the shift drum is rotated through a master arm rotated as one body with the shift spindle 76 by the shift spindle 76.

Further, while the above embodiment describes the motorcycle 10 as an example of the vehicle, the present invention is not limited to this but may be applied to such vehicles as three-wheeled vehicles and four-wheeled vehicles.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

DESCRIPTION OF REFERENCE SYMBOLS

10: Motorcycle (Vehicle)
17: Control unit (Controller)
21: Engine
25: Automatic transmission apparatus (Transmission apparatus)
61: Change clutch (Clutch)
62: Clutch operation mechanism (Clutch actuator)
63: Gear change mechanism (Shift actuator)
65: Main shaft
66: Countershaft
67b: Driving gear (Driving-side shifter gear)
68c: Driven gear (Driven-side shifter gear)
69a, 69b: Shift fork
70: Shift drum
70a: Lead groove
70b: Drum angle sensor
75: Shift motor (Motor)
76: Shift spindle
79: Shift spindle angle sensor (Spindle angle sensor)
C1: Maximum capacity (Fully engaged state)
C2: First intermediate capacity (Partial clutch engagement state)
C4: Disengagement capacity (Clutch disengaged state)
Dustd: Standard duty
Sd1: Drum angle threshold
θdtp: Rotary angle (Rotary angle of shift spindle at the time when standard duty is generated)

What is claimed is:

1. A transmission apparatus for a vehicle, comprising:
a main shaft to which rotary power of an engine is routed through a clutch, and which is provided with a plurality of drive gears including a drive-side shifter gear;
a countershaft provided with a plurality of driven gears including a driven-side shifter gear, the driven gears rotated by the plurality of drive gears;
a plurality of shift forks configured to move the drive-side shifter gear and the driven-side shifter gear in an axial direction;
a shift drum provided with a lead groove for engagement with end portions of the shift forks;
a drum angle sensor configured to detect a rotary angle of the shift drum;
a shift spindle provided with a clutch actuator configured to operate the clutch, and also with a shift actuator configured to operate the shift drum;
a spindle angle sensor configured to detect a rotary angle of the shift spindle;
a motor configured to rotate the shift spindle; and
a controller configured to control the motor;
wherein the clutch has a partial engagement state between a fully engaged state and a disengaged state thereof,
wherein, when the shift spindle is rotated to a shift-down side, the clutch actuator is rotated prior to the shift actuator, and
wherein during operation of the apparatus, the controller rotates the shift spindle to a shift-up side and stores, as a standard duty, a driving duty of the motor at the time when the rotary angle of the shift drum reaches a drum angle threshold, thereafter rotates the shift spindle to the shift-down side, and learns a rotary angle of the shift spindle at the time when the standard duty is generated, as a touch point at which the clutch is put into the partial engagement state.

2. The transmission apparatus for a vehicle according to claim 1, wherein control of the shift spindle at the time of learning the touch point is carried out through ramp response.

3. The transmission apparatus for a vehicle according to claim 1, wherein a characteristic of clutch lift amount of the clutch in relation to the rotary angle of the shift spindle is so set that the clutch lift amount on the shift-down side rises at a small rotary angle and increases at a steep gradient as compared with the clutch lift amount on the shift-up side.

4. The transmission apparatus for a vehicle according to claim 1, wherein control of learning of the touch point is carried out when the engine is started or once each time a main power source of the vehicle is supplied.

5. The transmission apparatus for a vehicle according to claim 4, wherein the controller stores in a nonvolatile memory the touch point learned when the engine has been operated last time or when a power source of the transmission apparatus has been turned on last time, and compares the touch point learned this time with the touch point learned last time.

6. A power unit for a vehicle, comprising:
a hollow crankcase;
an engine adapted to generate a driving force for selectively driving the vehicle, the engine comprising a crankshaft rotatably mounted in the crankcase;
a generator operatively connected to the engine;
a starting clutch provided on the crankshaft of the engine, and
a transmission apparatus disposed inside of the crankcase and adapted to selectively output a driving force of the engine, the transmission apparatus comprising:
a main shaft to which rotary power of the engine is routed through a clutch, and which is provided with a plurality of drive gears including a drive-side shifter gear;
a countershaft provided with a plurality of driven gears including a driven-side shifter gear, the driven gears rotated by the plurality of drive gears;
a plurality of shift forks configured to move the drive-side shifter gear and the driven-side shifter gear in an axial direction;
a shift drum provided with a lead groove for engagement with end portions of the shift forks;
a drum angle sensor configured to detect a rotary angle of the shift drum;
a shift spindle provided with a clutch actuator configured to operate the clutch, and also with a shift actuator configured to operate the shift drum;
a spindle angle sensor configured to detect a rotary angle of the shift spindle;
a motor configured to rotate the shift spindle; and
a controller configured to control the motor;
wherein the clutch has a partial engagement state between a fully engaged state and a disengaged state thereof,
wherein, when the shift spindle is rotated to a shift-down side, the clutch actuator is rotated prior to the shift actuator, and
wherein during operation of the apparatus, the controller rotates the shift spindle to a shift-up side and stores, as a standard duty, a driving duty of the motor at the time when the rotary angle of the shift drum reaches a drum angle threshold, thereafter rotates the shift spindle to the shift-down side, and learns a rotary angle of the shift spindle at the time when the standard duty is generated, as a touch point at which the clutch is put into the partial engagement state.

7. The power unit for a vehicle according to claim 6, wherein control of the shift spindle at the time of learning the touch point is carried out through ramp response.

8. The power unit for a vehicle according to claim 6, wherein a characteristic of clutch lift amount of the clutch in relation to the rotary angle of the shift spindle is so set that the clutch lift amount on the shift-down side rises at a small rotary angle and increases at a steep gradient as compared with the clutch lift amount on the shift-up side.

9. The power unit for a vehicle according to claim 6, wherein control of learning of the touch point is carried out when the engine is started or once each time a main power source of the vehicle is supplied.

10. The power unit for a vehicle according to claim 9, wherein the controller stores in a nonvolatile memory the touch point learned when the engine has been operated last time or when a power source of the transmission apparatus has been turned on last time, and compares the touch point learned this time with the touch point learned last time.

11. A vehicle comprising the transmission apparatus of claim 1.

12. A vehicle comprising the power unit of claim 6.

* * * * *